(12) United States Patent
Bardsley et al.

(10) Patent No.: US 7,370,345 B2
(45) Date of Patent: May 6, 2008

(54) DOMAIN CONTROLLING SYSTEMS, METHODS AND COMPUTER PROGRAM PRODUCTS FOR ADMINISTRATION OF COMPUTER SECURITY THREAT COUNTERMEASURES TO A DOMAIN OF TARGET COMPUTER SYSTEMS

(75) Inventors: Jeffrey S. Bardsley, Morrisville, NC (US); Ashley A. Brock, Morrisville, NC (US); Charles K. Davis, III, Mechanicsburg, PA (US); Nathaniel W. Kim, Raleigh, NC (US); John J. McKenna, Cary, NC (US); Carlos F. Villegas, Morrisville, NC (US)

(73) Assignee: Lenovo Singapore Pte. Ltd, Singapore (SG)

( * ) Notice: Subject to any disclaimer, the term of this patent is extended or adjusted under 35 U.S.C. 154(b) by 891 days.

(21) Appl. No.: 10/791,560

(22) Filed: Mar. 2, 2004

(65) Prior Publication Data

US 2005/0198520 A1   Sep. 8, 2005

(51) Int. Cl.
*G06F 17/30* (2006.01)
*G06F 17/00* (2006.01)
(52) U.S. Cl. ............... 726/3; 726/11; 726/30
(58) Field of Classification Search .......... 726/25, 726/23, 22, 3, 11, 30
See application file for complete search history.

(56) References Cited

U.S. PATENT DOCUMENTS

| 6,185,689 | B1 | 2/2001 | Todd, Sr. et al. |
| 6,408,391 | B1 | 6/2002 | Huff et al. |
| 2001/0027389 | A1 | 10/2001 | Beverina et al. |
| 2002/0026591 | A1 | 2/2002 | Hartley et al. |
| 2002/0099958 | A1 | 7/2002 | Hrabik et al. |
| 2002/0166063 | A1 | 11/2002 | Lachman, III et al. |
| 2002/0178383 | A1 | 11/2002 | Hrabik et al. |
| 2003/0004688 | A1 | 1/2003 | Gupta et al. |

(Continued)

FOREIGN PATENT DOCUMENTS

CA   2316005 A1   2/2002

(Continued)

OTHER PUBLICATIONS http://www.javvin.com/networksecurity/ThreatVector.html, year 2007.*

(Continued)

*Primary Examiner*—David Jung
(74) *Attorney, Agent, or Firm*—Myers Bigel Sibley & Sajovec

(57) ABSTRACT

A threat management domain controller is responsive to a computer-actionable threat management vector that includes a first computer-readable field that provides identification of at least one system type that is affected by a computer security threat, a second computer-readable field that provides identification of a release level for the system type and a third computer-readable field that provides identification of a set of possible countermeasures for a system type and release level. The threat management domain controller processes a threat management vector that is received for use by a domain of target computer systems, and transmits the threat management vector that has been processed to at least one of the target computer systems in the domain of target computer systems.

23 Claims, 38 Drawing Sheets

U.S. PATENT DOCUMENTS

2003/0004689 A1    1/2003    Gupta et al.
2003/0009699 A1    1/2003    Gupta et al.

FOREIGN PATENT DOCUMENTS

WO    WO 98/06020 A2    2/1998
WO    WO 00/70456 A1    11/2000

OTHER PUBLICATIONS http://www.networkworld.com/news/2006/013106-postini.html, year 2006.*

Design and Implementation of Cross-Domain Cooperative Firewall Cheng, Jerry; Yang, Hao; Wong, Starsky H.Y.; Zerfos, Petros; Lu, Songwu; Network Protocols, 2007. ICNP 2007. IEEE International Conference on Oct. 16-19, 2007 pp. 284-293.*

Configuration detection as a problem of knowledge discovery in computer networks Murayama, Y.; Cooperative Information Systems, 1997. COOPIS '97., Proceedings of the Second IFCIS International Conference on Jun. 24-27, 1997 pp. 47-55.*

Security policies to mitigate insider threat in the document control domain Suranjan Pramanik; Vidyaraman Sankaranarayanan; Shambhu Upadhyaya; Computer Security Applications Conference, 2004. 20th Annual Dec. 6-10, 2004 pp. 304-313.*

*About the VulnXML Project*, The Open Web Application Security Project, http://www.owasp.org/vulnxml/, 2001-2002, 2 pp.

Carnegie Mellon Software Engineering Institute, *CERT® /CC: Computer Security Incident Response Team FAQ*, http://www.cert.org/csirts/csirt_faq.html, 2002-2003, 9 pp.

*Citadel Hercules Automated Vulnerability Remediation Product Brochure*, Citadel Security Software Inc., 2003.

*CVE Common Vulnerabilities and Exposure (CVE) —MITRE Develops Valuable Resources for Sharing Vulnerability Information*, http://www.mitre.org/news/digest/archives/2000/vulnerability_info.html, 2000, 3 pp.

*Enabling Enterprise Security with CVE*, http://ww.mitre.org/news/digest/archives/2001/enterprise_security.html, 2001, 5 pp.

Ghosh et al., *Inoculating Software for Survivability*, Communications of the ACM, vol. 42, No. 7, Jul. 1999, pp. 38-44.

GSA Federal Technology Service, *Federal Computer Incident Response Center PADC (Patch Authentication and Dissemination Capability*, Smarter Solutions, Publication No. E-COTEO-03-0002.

12Biscom, *Network Security*, http://www.b2biscom.it/cms/Generic.jsp?IdPage=458, 2003, 1 p.

IBM, *Internet Data Center Value-Add Feature: Certifiable High-Speed RAM Web Servers*, Research Disclosure, #454147, Feb. 2002, p. 313.

IBM, *Remote-Controlled Write-Lock in Hard Disk (HD) Controllers*, Research Disclosure, #446114, Jun. 2001, p. 1001.

*ICAT Metabase Documentation*, http://icat.nist.gov/icat_documentation.htm, 5pp.

*ICAT Metabase: A CVE Based Vulnerability Database*, http://icat.nist.gov/icat.cfm, 2000-2002, 2pp.

Martin, *Managing Vulnerabilities in Your Networked Systems Using an Industry Standards Effort*, NDIA Federal Database Colloquium & Exposition, Oct. 25, 2001, 2 pp., Abstract at http://www.mitre.org/work/tech_papers/tech_papers_01/martin_1vulner/index.html.

Mitre, Press Release, *MITRE Announces New Standard for Computer Vulnerability Assessment*, http://www.mitre.org/news/releases/02/oval12_10_02.html, 2002, 2 pp.

Myerson, *Identifying Enterprise Network Vulnerabilities*, International Journal of Network Management, vol. 12, 2002, pp. 135-144.

*OASIS Members Collaborate to Address Security Vulnerabilities for Web Services and Web Applications*, http://www.oasis-open.org/news/oasis_news_04_14_03a.php, Apr. 14, 2003.

OWASP, *Introducing the OWASP Top Ten—Top Vulnerabilities in Web Applications*, The Open Web Application Security Project, http://www.owasp.org/, 2001-2002, 2 pp.

SANS Institute, *About the SANS Institute*, http://www.sans.org/aboutsans.php, 2002-2003, 4 pp.

Seltzer, *All the Threat Information You Want, and Then Some*, eWeek, Oct. 24, 2003, eweek.com/article2/0,4149,1362688,00.asp, 2 pp.

Symantec Corporation, *Symantec DeepSight Alert Service*, enterprisesecurity.Symantec.com/products/products.cfm?ProductID=160, 1994-2004, 2 pp.

Symantec Corporation, *Symantec™ DeepSight™ Threat Management System*, enterprisesecurity.Symantec.com/content/displaypdf.cfm?pdfid=301.

Tasker et al., *CVE Continues to Grow*, The Edge, Feb. 2001, http://www.mitre.org/news/the_edge/february_01/tasker.html, 2 pp.

*VulnXML Proof of Concept Vision Document, Version 1*, The Open Web Application Security Project, 2002, 7 pp.

\* cited by examiner

FIG. 13

System Table (indexed by System ID and System Name):

| SystemID (assigned by TMANA) | System Name (from NIST ICAT) | System Level Table |
|---|---|---|

Where System Level Table is defined as:

| Level ID (assigned by TMANA) | Version and Release Number (assigned by NIST ICAT or vendors) |
|---|---|

Subsystem Table (indexed by Subsystem ID and Subsystem Name):

| SubsystemID (assigned by TMANA) | Subsystem Name (from NIST ICAT) | Subsystem Level Table (as above) |
|---|---|---|

Threat Severity Table (indexed by Severity ID and Severity Name):

| Severity ID (assigned by TMANA) | Severity Name (from NIST ICAT) |
|---|---|

Countermeasure (CM) Table (indexed by CM ID, CM Type, and CM Name):

| CM ID (assigned by TMANA) | CM Type (assigned by TMANA) | CM Name (assigned by TMANA) |
|---|---|---|

DOMAIN CONTROLLING SYSTEMS, METHODS AND COMPUTER PROGRAM PRODUCTS FOR ADMINISTRATION OF COMPUTER SECURITY THREAT COUNTERMEASURES TO A DOMAIN OF TARGET COMPUTER SYSTEMS

FIELD OF THE INVENTION

This invention relates to computer systems, methods, program products and/or data structures, and more particularly to security management systems, methods, program products and/or data structures for computer systems.

BACKGROUND OF THE INVENTION

Computer systems are widely used for data processing and many other applications. As used herein, a "computer system" encompasses enterprise, application and personal computer systems, pervasive computer systems such as personal digital assistants, and embedded computer systems that are embedded in another device such as a home appliance that has another primary functionality.

As information technology continues to expand at a dramatic pace, computer systems are subject to larger numbers of security threats and vulnerabilities. System administrators may be overburdened with not only gathering and maintaining information on new vulnerabilities and patches, but may also need to wrestle with the task of determining what patches need to be applied and to what systems. A desire for computer systems to be kept current to known and developing security threats may produce a problem of enormous proportions.

Many vendors and independent developers have sough to create and develop ways in which computer system administrators can find out the current vulnerability stats of the their systems. In particular, vendor programs, utilities and locally generated scripts have been provided that can reveal specific information about computer systems. Thus, for example, Microsoft has provided a utility called HFNETCK, created by Shavlik, which scans host systems for missing patches. Moreover, Unix systems have built-in commands that can list operating system and patch level information. Several databases have also been created as repositories of information about computer systems, including IP addresses, operating system vendor version and possibly the latest patches applied.

For example, the Mitre Corporation (Mitre.org) has promulgated Common Vulnerabilities and Exposures (CVE), which anecdotally represent vulnerabilities and exposures using a text string with a chronological identification vector and free-form text. An example CVE is "CVE-2001-0507+ free form text". Moreover, the National Institute of Standards and Technology (NIST) has created an ICAT Metabase, which is a searchable index of information on computer vulnerabilities. Using CVE names, the ICAT Metabase vulnerability indexing service provides a short description of each vulnerability, a list of characteristics of each vulnerability (such as associated attack range and damage potential), a list of the vulnerable software names and version numbers, and links to vulnerability advisory and patch information. See icat.nist.gove/icat.cfm. Also, in the fourth quarter of 2002, Mitre launched the Open Vulnerability Assessment Language (OVAL) initiative, to extend the CVE concept to a common way of vulnerability testing.

The Open Web Application Security Project (owasp.org) is an open source community project that is developing software tools and knowledge-based documentation the helps secure Web applications and Web services. The VulnXML project of OWASP aims to develop an open standard data format for describing Web application security vulnerabilities. The project is focused on Web application security vulnerabilities. It focuses on building http transactions such as specific headers and requests. See the VulnXML Proof of Concept Vision Document, Version 1.1, Jul. 18, 2002.

The Patch Authentication and Dissemination Capability (PADC) project, sponsored by the Federal Computer Incident Response Center (FedCIRC), an office of the General Service Administration, first announced in November, 2002, addresses the more general case of application and operating system vulnerabilities. See, padc.fedcirc.gov. Although contracts have been awarded, PADC services is not presently available.

The OASIS Consortium (oasis-open.org) has announced plans to define a standard method of exchanging information concerning security vulnerabilities within Web services and Web applications. See, *OASIS Members Collaborate to Address Security Vulnerabilities for Web Services and Web Applications*, RSA Security Conference, 14 Apr. 2003.

The Vulnerability Intelligent Profiling Engine (VIPE) is based on technology by B2Biscom (b2biscom.it). VIPE includes two elements, a product and a service. The product is a combination of an inventor and patch management tool, which has as its major part of a central database containing all known vulnerabilities and patches for a large list of products. Another part of the database is populated with inventory information. A set of scripts has been developed. The service analyzes and correlates inventory with an existing vulnerability encyclopedia, and provides a knowledge-based approach for assessing vulnerabilities against specific supported operating systems.

Citadel Hercules Automated Vulnerability Remediation from Citadel Security Software (citadel.com) provides software that integrates with industry-leading vulnerability assessment tools and provides appropriate remedies for five classes of vulnerabilities, and a console where the administrator can review the vulnerabilities implied and apply the remedy to the correct system on a network. See, *Citadel Hercules Automated Vulnerability Remediation Product Brochure*, Citadel Security Software, Inc., 2003.

Finally, Symantec has an offering that compiles threat management information into a paid service. See, eweek-com/article2/0,4149,1362688,00.asp. DeepSight Alert Services are priced at $5K per year as described in enterpris-esecurity.symantec.com/products/products.cfm?ProductID=160. Threat Management Services start at $15K per year, per user as described at enterprise-curity.symantec.com/content/displaypdf.cfm?pdfid=301.

In view of the above, security threat management currently may be a labor-intensive process wherein a computer system's operations staff individually screens security advisories, alerts and Authorized Program Analysis Reports (APARs) to determine their applicability. The operational staff then determines, through research, how to mitigate the threat or apply the remedy using manual techniques.

FIG. 1 is a block diagram illustrating conventional security threat management techniques. As shown in FIG. 1, new computer vulnerabilities and hacking tools are discovered by computer security experts 110 in a variety of roles. Similarly, APARs are provided by vendors 120. The computer vulnerabilities, hacking tools and APARs (often referred to as $A^3$ (Advisories, Alerts, APARs) are typically vetted by appropriate security organizations such as Computer Emergency Response Team (CERT/CC), SysAdmin, Audity, Network and/or Security (SANS) institute personnel 130. Threat and vulnerability information is distributed by these organizations primarily via mailing lists 140 that are subscribed to by computer Security Systems Administration (SSA) staffs 150. Diligent SSAs may subscribe to multiple mailing lists 140, thus often receiving duplicate or potentially inconsistent information. SSAs then perform individual research to determine a course of action and how to carry it out. Commonly, they will use Web resources such as Mitre's CVE listing 160 and/or Oval database 170, and/or NIST's ICAT database 180, to manually collect information for countermeasure application. This may be highly inefficient and costly. Even commercially available vulnerability management products and services may not substantially improve efficiency.

SUMMARY OF THE INVENTION

According to embodiments of the present invention, a Threat Management Domain Controller (TMDC) is responsive to a computer-actionable threat management vector (TMV). TMVs are described in U.S. application Ser. No. 10/624,344 to Bardsley et al., entitled Systems, Methods and Data Structures for Generating Computer-Actionable Computer Security Threat Management Information, filed Jul. 22, 2003, and application Ser. No. 10/624,158 to Bardsley et al., entitled Systems, Methods and Computer Program Productsfor Administration of Computer Security Threat Countermeasures to a Computer System, filed Jul. 22, 2003, both of which are assigned to assignee of the present invention, the disclosures of which are hereby incorporated herein by reference in their entirety as if set forth fully herein. Application Ser. Nos. 10/624,344 and 10/624,158 will be referred to herein collectively as "the prior applications". As described therein a TMV includes therein a first computer-readable field that provides identification of at least one system type that is affected by a computer security threat, a second computer-readable field that provides identification of a release level for the system type, and a third computer-readable field that provides identification of a set of possible countermeasures for a system type and a release level. The system type can comprise a computer operating system type or an application program type.

According to some embodiments of the present invention, the TMDC is responsive to a TMV and is configured to process a TMV that is received for use by a domain of target computer systems and to transmit the TMV that has been processed to at least one of the target computer systems in the domain of target computer systems. Stated differently, in some embodiments, the TMV is transmitted to all target systems in the domain that are susceptible to the vulnerability. Accordingly, a TMDC according to some embodiments of the present invention can operate within an administrative domain of a collection of target systems and can mediate between a TMV generator that generates a TMV and the target computer systems. A TMDC can thereby reduce or eliminate the need for the TMV generator to maintain knowledge of target computer system identities, configurations and/or operational status, and can improve or optimize the bandwidth that is used for TMV transmission and the utilization of network infrastructure components for TMV transmission. In some embodiments the TMDC can also reduce or minimize I/O subsystem, buffer storage and/or CPU utilization at the target systems for processing of TMVs. Finally, in some embodiments, the TMDC can establish a central source for target system program instance inventory information.

In some embodiments, the TMDC is configured to process a TMV that is received for use by a domain of target computer systems and to transmit the TMV that has been processed to at least one of the target computer systems in the domain of target computer systems, by selectively transmitting the TMV that is received to the at least one of the target computer systems if the TMV applies to the at least one of the target computer systems. In other embodiments, the TMDC is configured to selectively transmit selected TMV fields in the TMV that is received, to the at least one of the target computer systems. In still other embodiments, the TMDC is configured to mutate the TMV that is received to a format that is compatible with the domain of target systems. In yet other embodiments, the TMDC is configured to transmit to the selected one of the target computer systems, the TMV, including a Program Instance (PI) vector that identifies a program instance at a selected one of the target computer systems.

In other embodiments, the TMDC is configured to generate a TMV Generation Number (TMVGN) that tracks TMVs that are processed by the TMDC and to use the TMVGN to control transmitting of TMVs that were not previously transmitted to a program instance at a target computer system due to unavailability of the program instance, upon availability of the program instance. In yet other embodiments, the TMDC is further configured to provide a Domain Store and Forward Repository (DSFR) that is configured to store a TMV until the TMV has been provided to all program instances in the domain of target computer systems, and to purge the TMV thereafter.

In some embodiments, at least one of the target systems comprises a plurality of program instances, and the target system is configured to register the plurality of program instances with the TMDC. In some embodiments, each of the program instances is configured to register with the TMDC. In other embodiments the target system itself is configured to register the plurality of program instances in the target system with the TMDC.

It will be understood that embodiments of the invention have been described above primarily with respect to domain controller systems for administering a computer security threat countermeasures to a domain of target computer systems. However, other embodiments of the present invention provide a computer-implemented method and/or a computer program product that is configured to administer a computer security threat countermeasures to a domain of target computer systems.

BRIEF DESCRIPTION OF THE DRAWINGS

FIGS. 7-14 illustrate detailed data structures of threat management vectors and sub-vectors according to the prior applications.

DETAILED DESCRIPTION

Figure 1:
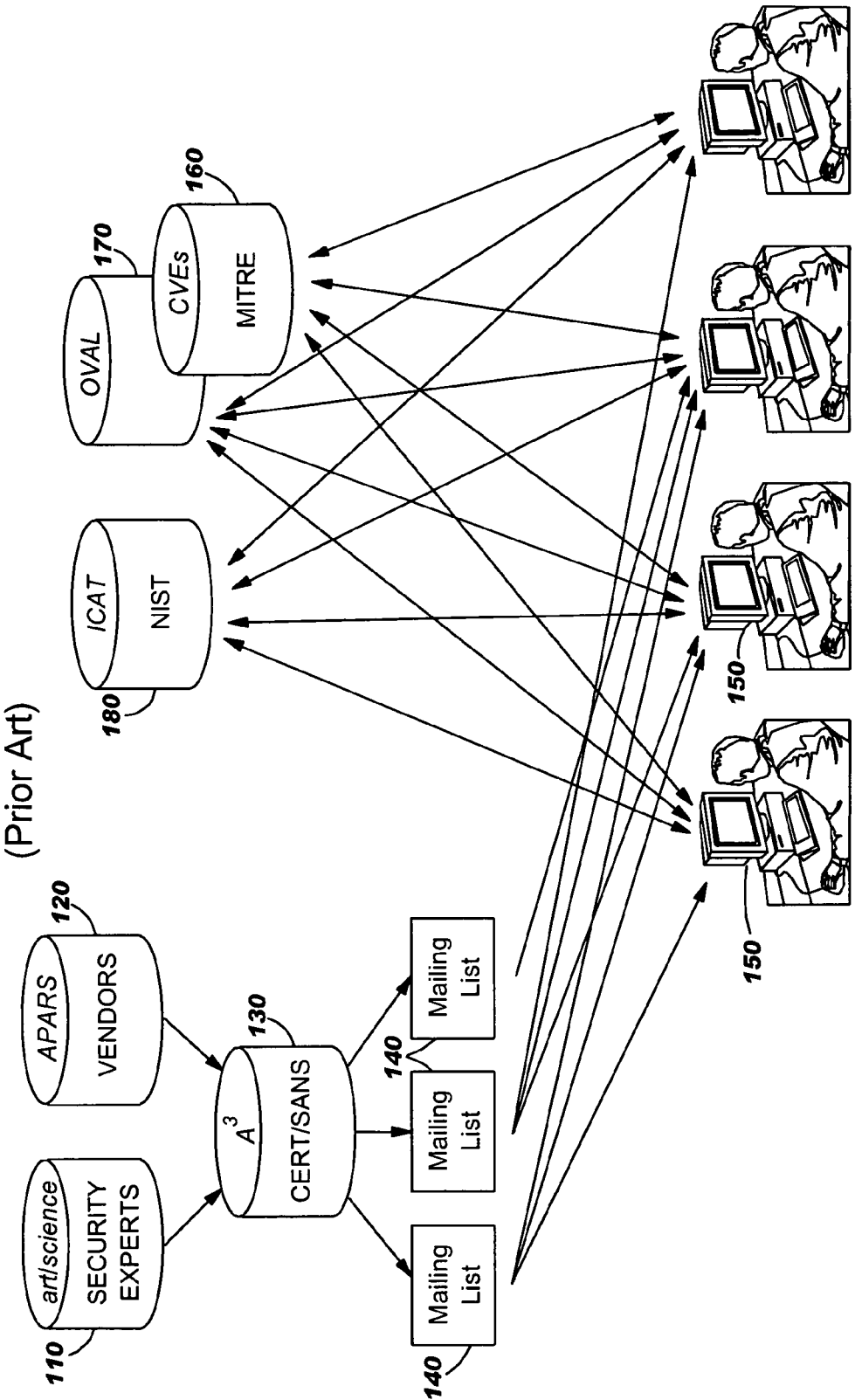
FIG. 1 is a block diagram illustrating conventional security threat management techniques.

The present invention now will be described more fully herein with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The present invention is described below with references to block diagrams and/or flowchart illustrations of methods, apparatus (systems) and/or computer program products according to embodiments of the invention. It is understood that each block of the block diagrams and/or flowchart illustrations, and combination of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the function/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Generating Computer-Actionable Computer Security Threat Management Information

Figure 2:
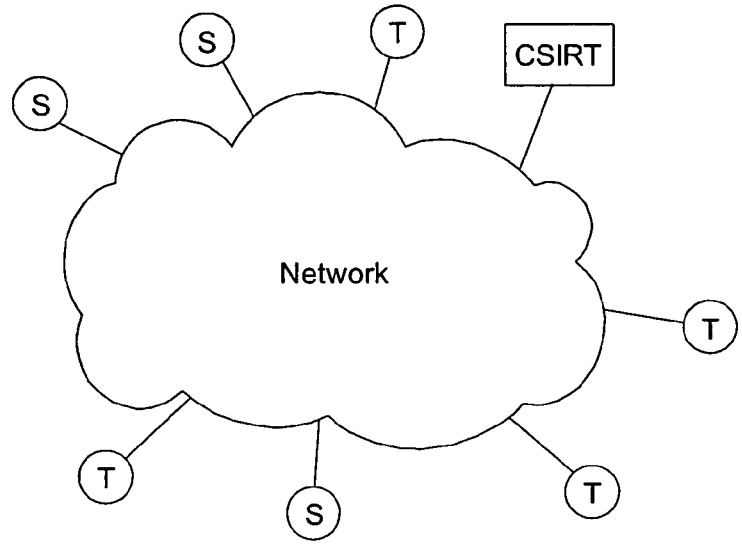
FIG. 2 is a block diagram of an environment in which computer-actionable computer security threat management information may be generated according to the prior applications.

FIG. 2 is a block diagram of an environment in which computer-actionable computer security threat management information may be generated according to the prior applications. As shown in FIG. 2, a plurality of sources S of vulnerability threat and/or APAR information are connected to a Computer Security Incident Response Team (CSIRT) or other security-responsible server via a network, which can be a local and/or wide area network including the Web. The sources S can be one or more of the sources 110, 120, 130, 160, 170, 180 of FIG. 1, and/or other sources. The CSIRT server sends computer-actionable computer security threat management information to a plurality of target computer systems T which can be one or more enterprise, application, personal, pervasive and/or embedded systems that may be connected to the CSIRT directly and/or via a network. According to the prior applications, the computer-actionable computer security threat management information comprises one or more computer-actionable Threat Management Vectors (TMV), as will be described in detail below.

Figure 3:
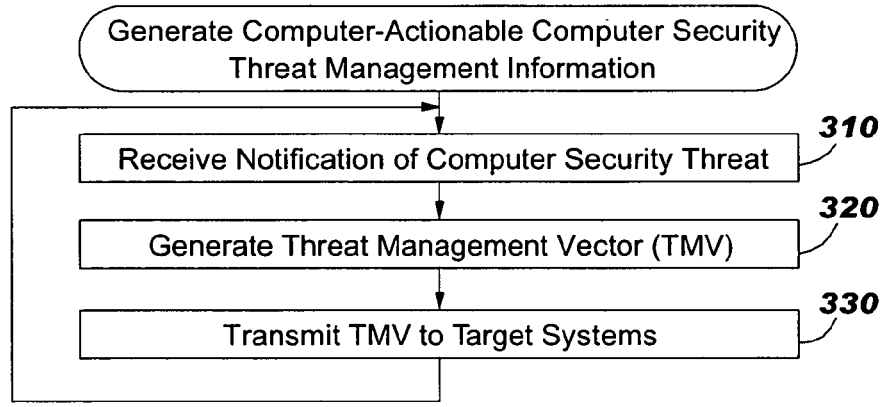
FIG. 3 is a flowchart of operations that may be performed to generate computer-actionable security threat management information according to the prior applications.

FIG. 3 is a flowchart of operations that may be performed, for example by the CSIRT server, to generate computer-actionable computer security threat management information, according to the prior applications. As shown in FIG. 3, notification of a computer security threat is received at Block 310. At Block 320, a computer-actionable TMV is generated from the notification that was received. Further description of the TMV will be provided in FIG. 4. Then, at Block 330, the TMV, or a form of the TMV, that is generated is transmitted to a plurality of target systems for processing by the plurality of target systems.

Figure 4:
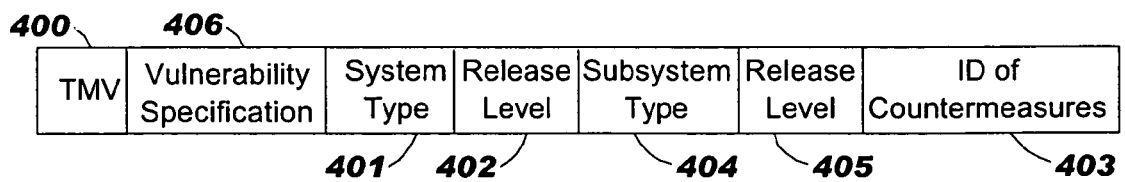
FIG. 4 is an overview of a data structure of a threat management vector according to the prior applications.

FIG. 4 is an overview of a data structure of a TMV according to the prior applications. Further details will be provided below. As shown in FIG. 4, the TMV 400 includes a first computer-readable field 401 that provides identification of at least one system type, such as an operating system type, that is affected by the security threat, a second computer-readable field 402 that provides identification of a release level for the system type, and a third computer-readable field 403 that provides identification of a set of possible countermeasures for a system type and a release level. Moreover, in some embodiments, the TMV includes a fourth computer-readable field 404 that provides identification of at least one subsystem type, such as an application program type, that is affected by the computer security threat and a fifth computer-readable field 405 that provides identification of a release level for the subsystem type. In these embodiments, the third computer-readable field 403 provides identification of a set of possible countermeasures for a subsystem type and a release level in addition to a system type and release level. Moreover, in some embodiments, the TMV includes a sixth computer-readable field 406 that identifies a vulnerability specification, also referred to herein as a "root VKey vector", to identify the vulnerability or security threat.

Figure 5:
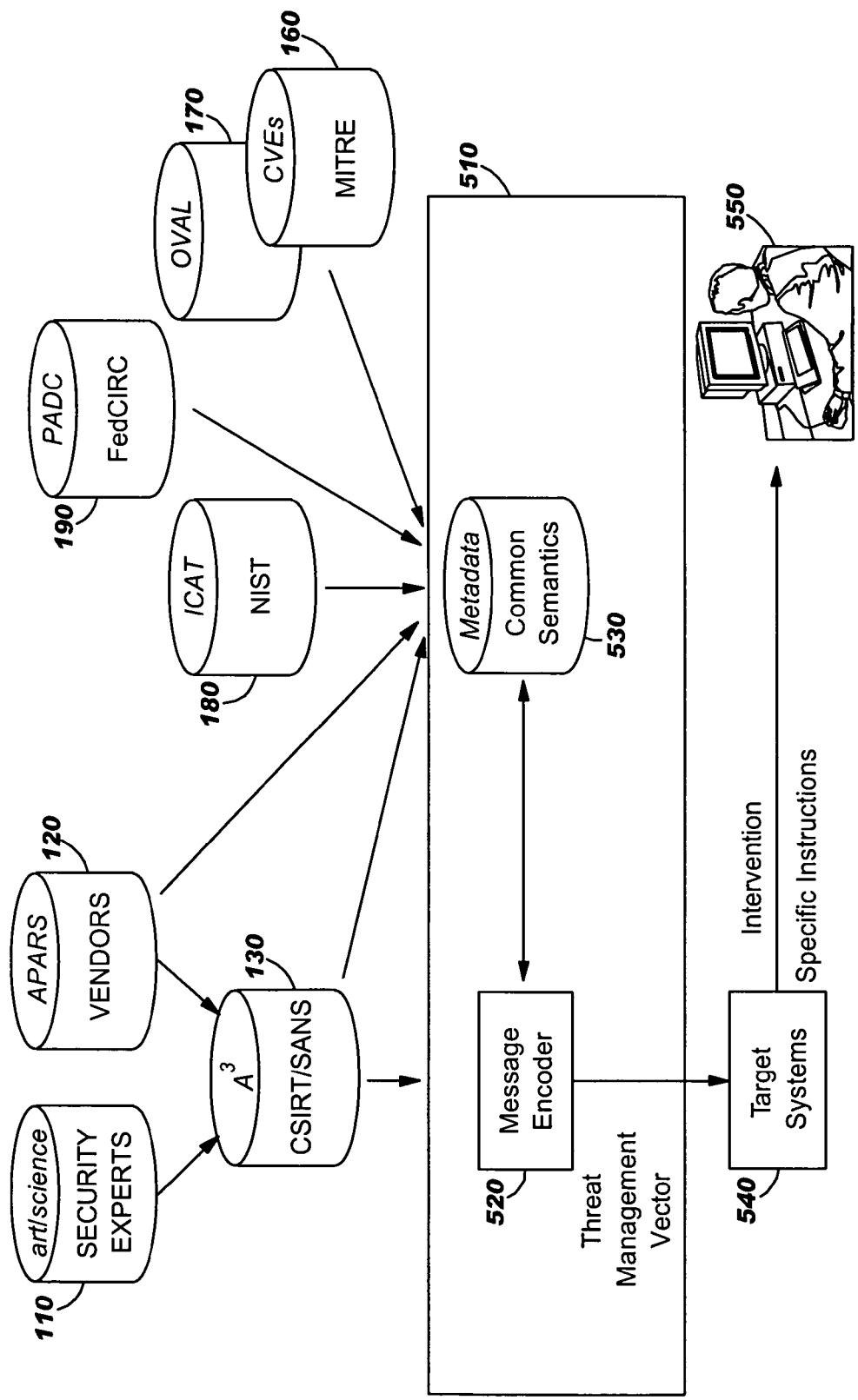
FIG. 5 is a block diagram of systems, methods and/or computer program products for generating computer actionable-security threat management information according to the prior applications.

FIG. 5 is a block diagram of systems, methods and computer program products for generating computer-readable security threat management information according to the prior applications. As shown in FIG. 5, notification of a computer security vulnerability threat or countermeasure to a vulnerability or threat is received at a central clearinghouse, also referred to herein as a CSIRT 510, from various sources 110-130 and 160-190 that were described above. Other sources may also be utilized. At the CSIRT 510, a message encoder 520 transforms vulnerability, threat, APAR and/or information via human analysis and/or computer-assisted encoding into an unambiguous computer-interpretable form, referred to as a TMV. A common semantics database 530 establishes and maintains, via human analysis and/or computer-assisted encoding, the metadata used by the message encoder 520 to create the TMV. One example is a set of assigned numbers representing computer operating system names. The message encoder 520 produces a TMV in computer-actionable format. For each specific vulnerability, threat or countermeasure, the TMV stipulates target system components and parameterized countermeasure installation instructions for automated application. The TMV is then transmitted to target systems 540. Target System Security Administrators (SSA) 550 may be advised of interventions that may be required to be performed if fully automatic intervention is not present, and/or of specific instructions. Human labor can thereby be reduced dramatically.

Figure 6:
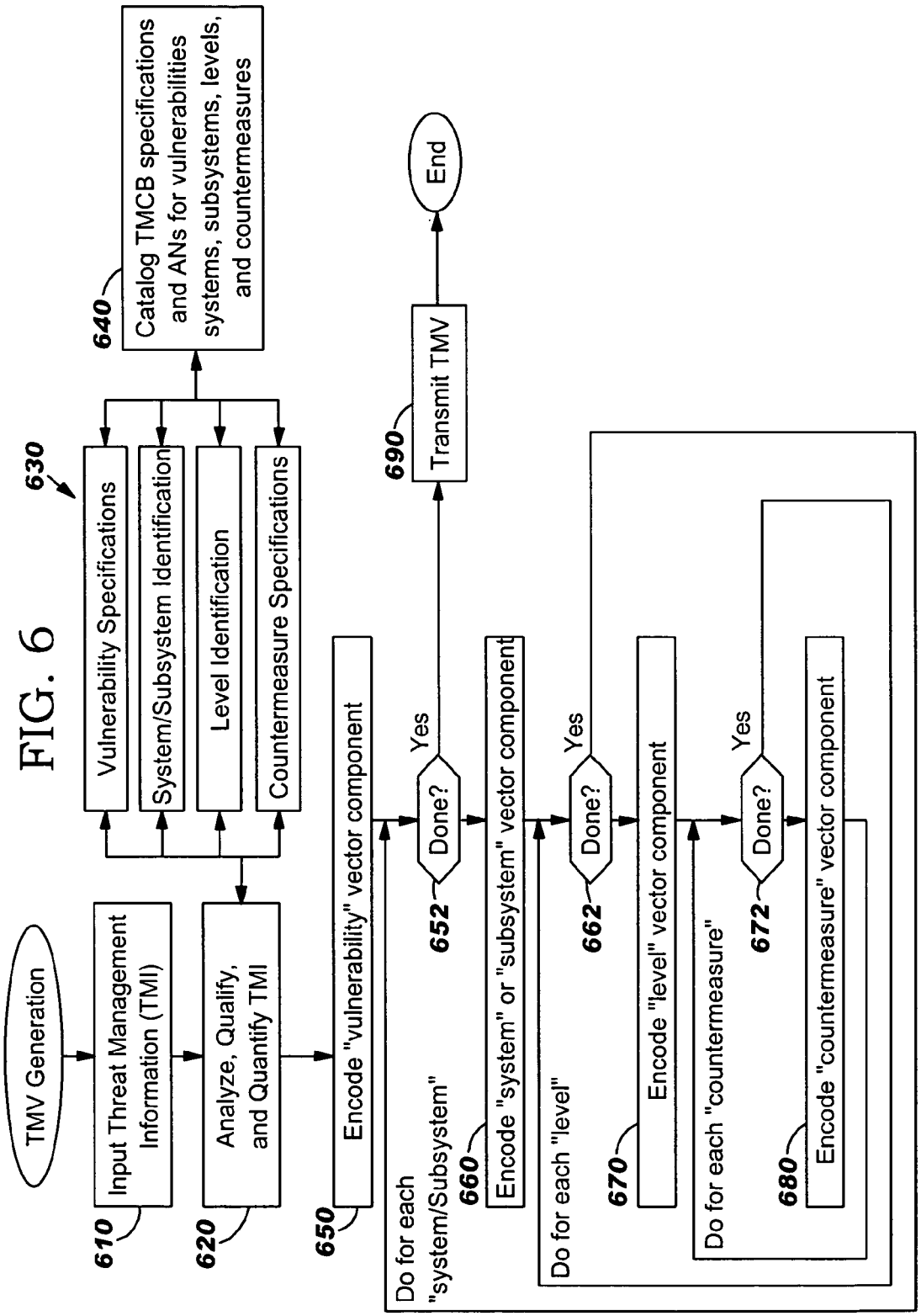
FIG. 6 is a flowchart of operations that may be used to generate a threat management vector by a message encoder according to the prior applications.

FIG. 6 is a flowchart of operations that may be used to generate a TMV by a message encoder, such as the message encoder 520 of FIG. 5. FIG. 6 refers to vulnerability alerts and advisories and patch or other countermeasure information as Threat Management Information (TMI). As shown at Block 610, TMI may originate from security organizations, vendors, independent security professionals and/or other sources. TMI may include, but is not limited to, data about vulnerabilities in an operating system or application program or software utility, countermeasures for correcting a vulnerability, or both. Examples of TMI are new or revised security alerts and advisories from CERT/CC or SANS Institute and new or revised patch notifications from vendors.

Referring to FIG. 6, conceptually, TMV generation (TMVG) can be considered a two-stage process. However, in practice, it may be implemented as a single set of integrated operations.

In the first stage, at Block 610, TMI acts as input stimuli for a process of analysis, qualification and quantification (AQQ) at Block 620. Analysis may involve a general analysis and research of the input for completeness and coherence. Qualification may involve validating the accuracy, consistency, source integrity and efficacy of the information for threat management use. Qualification also may involve such details as testing a proposed patch or script on an operating system, application program, or program utility instance in a laboratory or simulated production environment. Finally, quantification may involve ensuring that all relevant TMI has an unambiguous representation in a catalog entity called the Threat Management Control Book (TMCB) such that each information component 630 is discernible via assigned numbers (ANs). The AQQ team, in fact, may represent a threat management assigned number authority (TMANA) by virtue of its authority to create, delete, and otherwise ensure the referential integrity of ANs in the TMCB, respective of external assigned number authorities (ANAs).

In some embodiments, it may be desirable that all ANs and corresponding information encodings for the complete construction of a TMV representing the TMI are available in the TMCB. Any TMI not found to be so represented may be formulated and cataloged in the TMCB by the TMANA at Block 640. TMI categories may include, but are not limited to, vulnerability identity and specification, system identity, system level identity, subsystem identity, subsystem level identity, and countermeasure identity and specification.

The second stage may involve the systematic encoding (Blocks 650-680) of the physical TMV using TMCB content and its subsequent transmission (Block 690) to target systems for autonomic threat management processing. TMV encoding may involve a cascading nested sequence of encode operations 650, 660, 670, 680 for a given vulnerability 650 such that each affected system type 652 is identified, and for each of these 662, each affected level 670 is identified, and for each of these 672 all applicable countermeasures 680 are encoded in machine-readable format, as shown in FIG. 6. A similar cascading nested sequence of encode operations may be performed likewise for affected subsystems.

Figure 7:
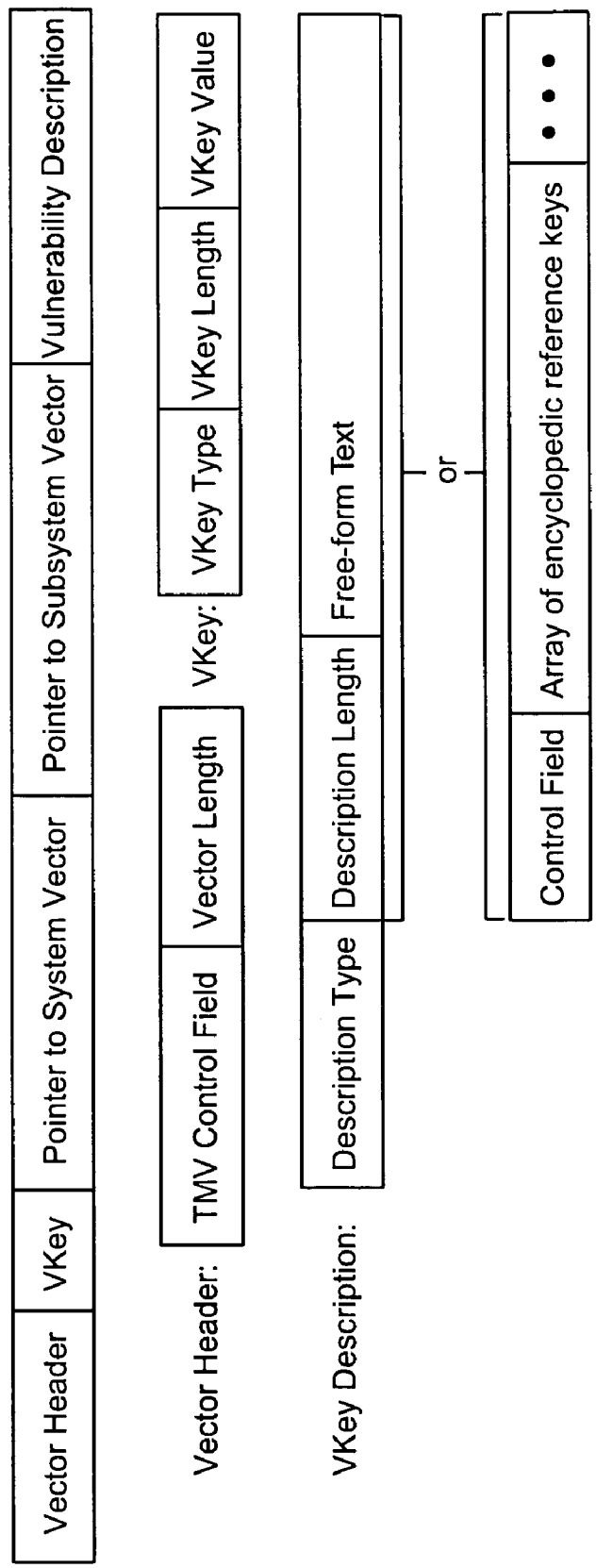

FIG. 7 illustrates a general form of a TMV according to the prior applications. As was described above, the TMV can transform the computationally ambiguous information, such as CVE information and/or other information, into a precise specification of vulnerability attributes and countermeasure attributes. The resultant encoding can then be used by programs to automate the reconciliation of threat specifics to a well-defined set of compensating countermeasures to be applied to specific target computer systems.

As shown in FIG. 7, a TMV according to the prior applications may include a Vector Header, a VKey, such as a CVE Key, a Pointer to System Vector, a Pointer to a Subsystem Vector and a VKey Description. It will be understood that CVE is used herein as one example of a vulnerability key (VKey), but that any other key(s) may be used. It also will be understood that the VKey Description may be a free form text description and/or an encyclopedic reference key to a text description held elsewhere, and may be included in the vector header as a usability aid. As also shown in FIG. 7, the Vector Header may include a TMV Control field and a Vector Length field. The VKey field may include VKey Type, VKey Length and VKey Value fields. Finally, the VKey Description may include a Description Type, Description Length and free form text, or a Control field and an Array of encyclopedic reference keys. FIGS. 8-12 provide detailed descriptions of the System Vector, System Level Vector, Countermeasures Vector, Countermeasures Metadata and Subsystem Vector.

Figure 8:
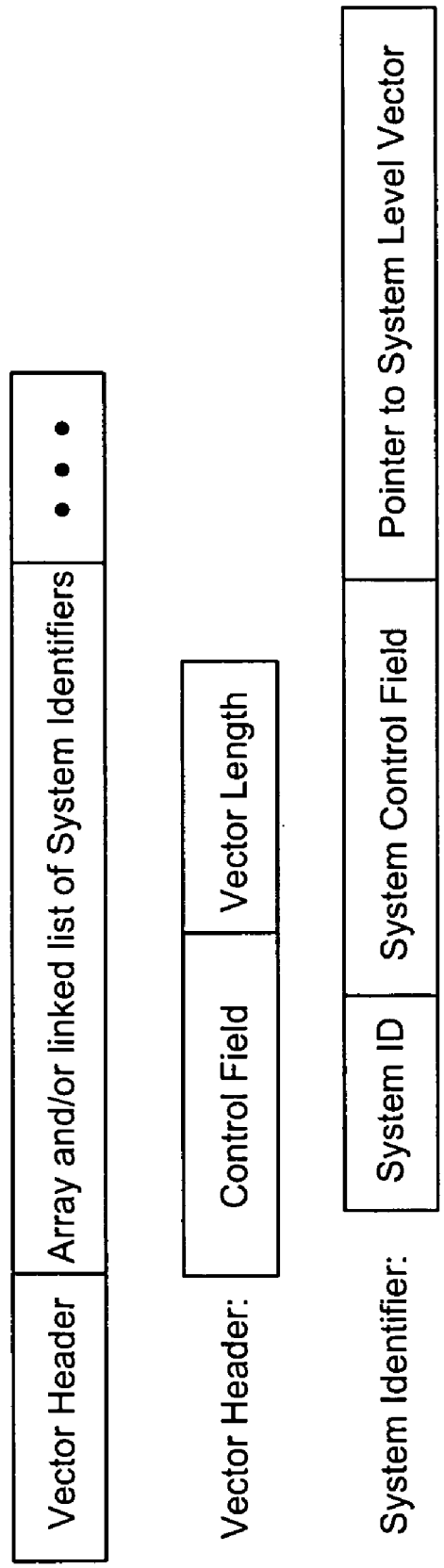

FIG. 8 illustrates a general form of the System Vector according to the prior applications. The System Vector identifies the Operating System (OS) type(s) to which a vulnerability applies. It may include a Vector Header and an array and/or linked list of System Identifiers corresponding to specific OS types, such as Sun Solaris, AIX, etc. As also shown in FIG. 8, the Vector Header may include a Control field and a Vector Length field. The System Identifier can include a System ID field, a System Control field and a Pointer to System Level Vector field. The System Control Field is used to maintain system oriented processing controls. System IDs are globally unique codes which map to specific operating system types. The code values and the correspondence to their conventional system names are maintained in machine-readable form in a common semantics database, referred to as a Threat Management Control Book (TMCB), described below.

Figure 9:
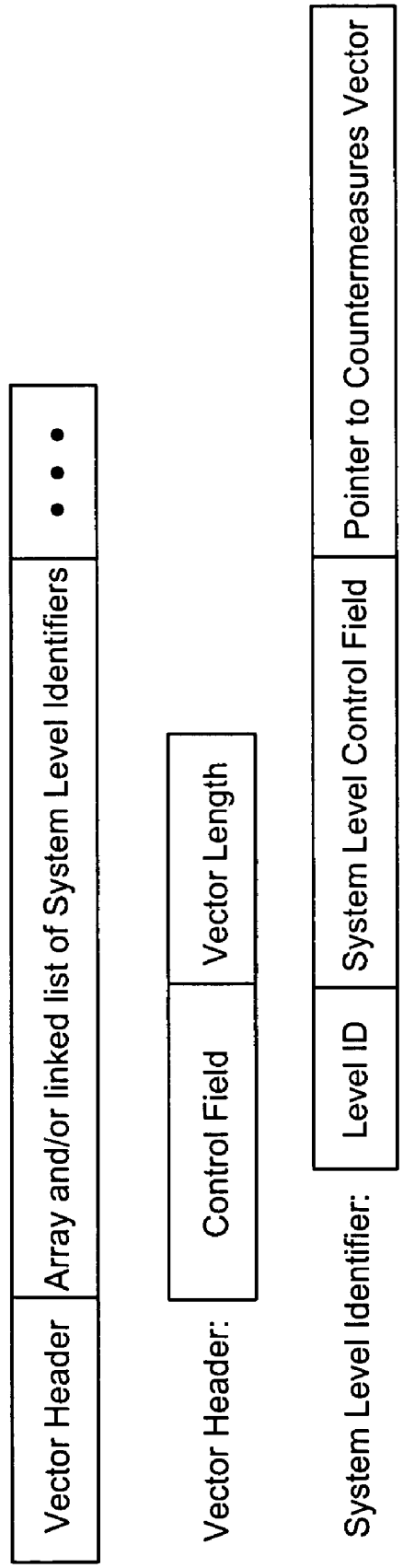

FIG. 9 illustrates a general form of the System Level Vector. As shown in FIG. 9, the System Level Vector may include a Vector Header and an array and/or linked list of System Level Identifiers. The Vector Header may include a Control field and a Vector Length field. The System Level Identifier may include a Level ID field, a System Level Control field, and a Pointer to a Countermeasures Vector. The System Level Vector identifies the specific operating system version and release levels to which a vulnerability or countermeasure applies. The System Level Control field is used to maintain system level directed processing controls. Level IDs are system-wide unique codes which map to specific operating system versions and release levels. The code values and the correspondence to their conventional product version and release names are maintained in machine-readable form in the TMCB as will be described below.

Figure 10:
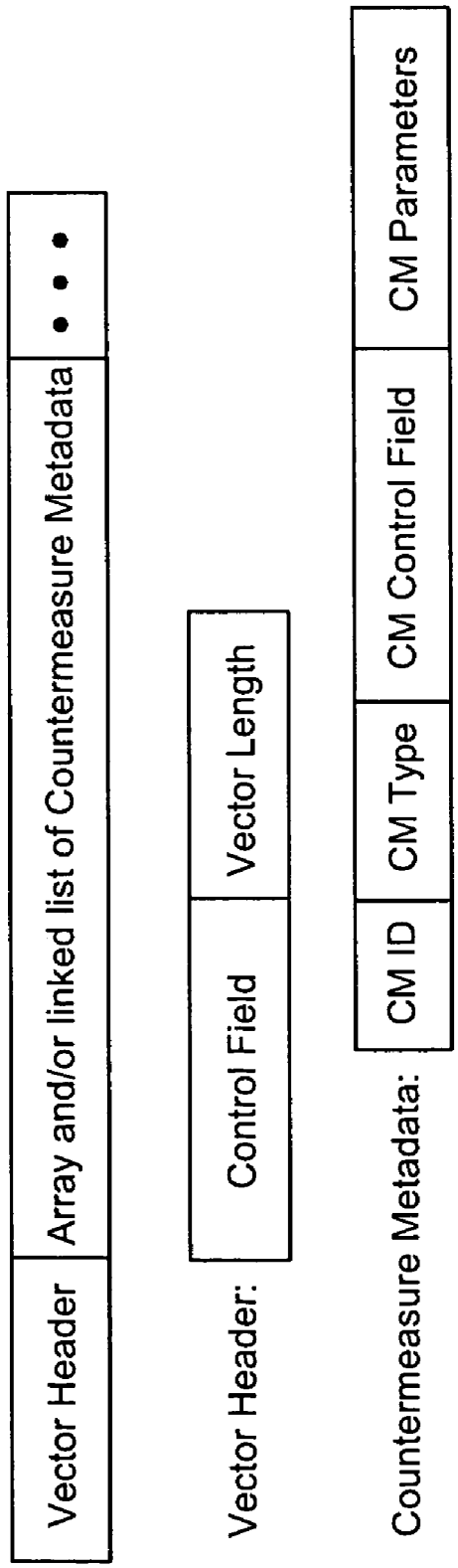

FIG. 10 illustrates a general form of a Countermeasures Vector according to the prior applications. As shown in FIG. 10, the Countermeasures Vector may include a Vector Header and an array and/or linked list of Countermeasures Data. The Vector Header may include a Control field and a Vector Length field. The Countermeasures Metadata may include a Countermeasures (CM) ID, a CM Type, a CM Control field and CM Parameters. The Countermeasures Vector identifies the specific countermeasures applicable to a specific version or release level of a specific operating system (system) or application (subsystem) version, in order to counteract the vulnerability. The countermeasures vector thus identifies a locus of points in the TMV subspace, as located by the directed graph formed by the System Vector, Level Vector and/or Subsystem Vector, Subsystem Level Vector, representing the applicable set of countermeasures such as patches.

Figure 11:

FIG. 11 illustrates a general form of Countermeasure Metadata of FIG. 10. Countermeasure Metadata provides the information that is used to apply a countermeasure. Referring to FIG. 11, CounterMeasure ID (CMID) is a globally unique code which maps to a specific countermeasure, as defined in the TMCB (described below). CM Type and CM Parameters permit the specification of countermeasure installation instructions. Examples of CM Types might include "local", "server", "URL", "Binary" or "manual", representing various modes of countermeasure installation. The CM Control Field is used to maintain processing controls associated with countermeasure deployment. Examples of CM Parameters might include metadata representing interface parameters to a local or remote patch application service, a URL, embedded countermeasure installation instructions (text) and/or an encyclopedic reference to same. The specific control mechanisms for specification of CM Parameters and installation of countermeasures is a function of the individual countermeasures themselves, and need not be described herein.

Figure 12:
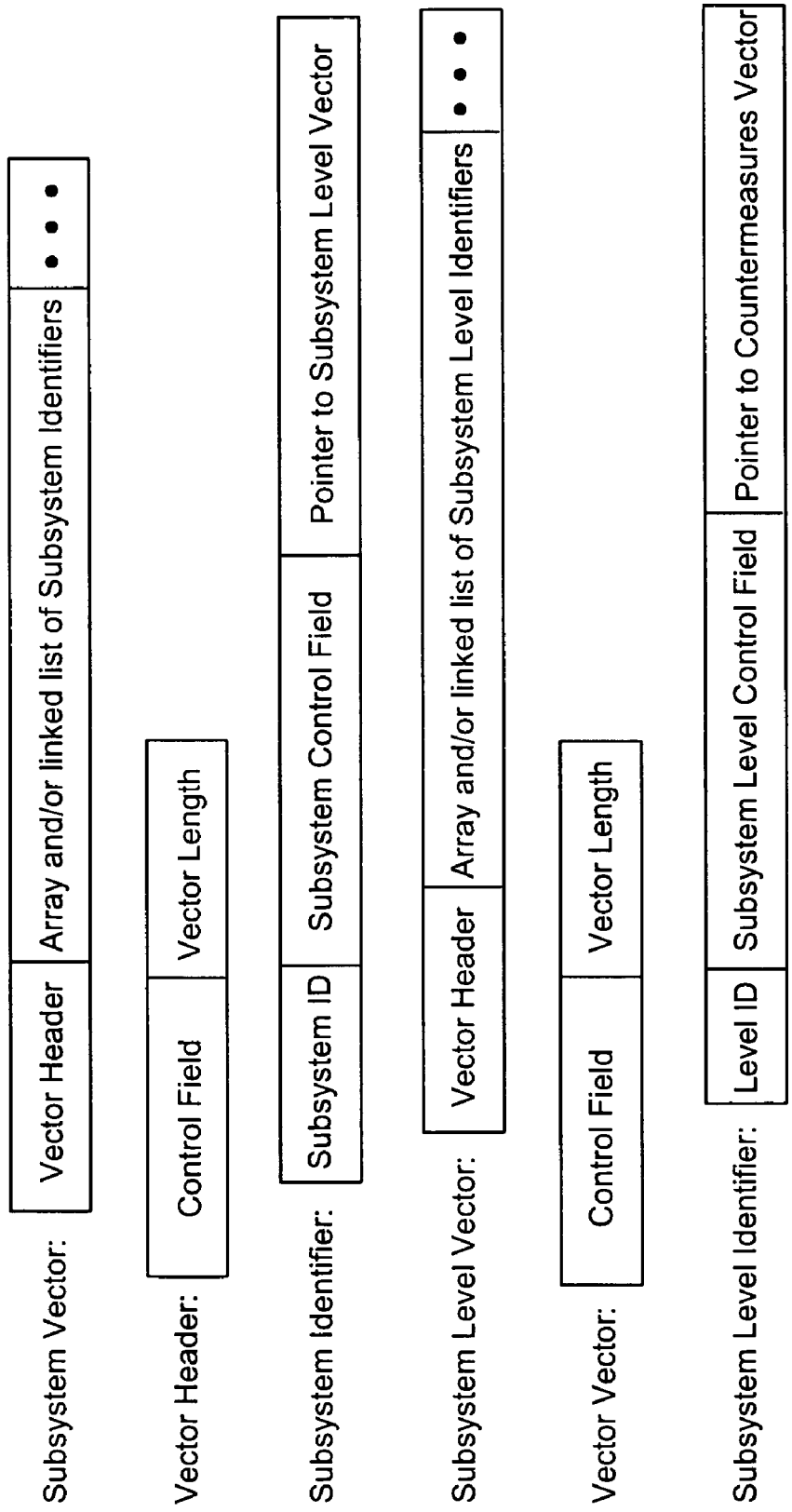

FIG. 12 is an overview of a Subsystem Vector. As was described above, security vulnerabilities may involve not only operating systems but also subsystems, such as protocol engines, applications programs and utilities. The Subsystem Vector identifies the subsystems or application types to which a vulnerability applies. It includes an array of system identifiers corresponding to specific software entities, such as Microsoft IIS. The Subsystem Vector can be structurally identical to the System Vector, except that it applies to application software that uses the operating system, as opposed to the operating system itself. It also will be understood that the semantics of the Countermeasures Vector elements may be repeated in the subsystem vector taxonomy.

FIG. 13 illustrates a general form of a Threat Management Control Book (TMCB) according to the prior applications, which may correspond to the common semantics database 530 of FIG. 5. As was already described, the TMCB includes an indexing structure containing the metadata associated with the standard values used in the TMV encoding. It enables the transformation of nonstandard or bulky information into unambiguous and compact equivalent forms, for packaging in a TMV. Such data transforms are established by a Threat Management Assigned Number Authority (TMANA). In general, the TMCB is the registry of standard values encoded in TMV configurations.

FIG. 13 illustrates tables that can be maintained in the TMCB. As shown in FIG. 13, the system table may include a System ID, a System Name, and a System Level Table field, and may be indexed by System ID and System Name. The System Level Table may include a Level ID and a Version and Release Number field. The Subsystem Table may include a Subsystem ID, Subsystem Name and Subsystem Level Table, and may be indexed by Subsystem ID and Subsystem Name. The Threat Severity Table may include a Severity ID and a Severity Name field, and may be indexed by the Severity ID and Severity Name. The Countermeasure Table may include a CM ID, CM Type and CM Name field, and may be indexed by the CM ID, CM Type and CM Name fields. It will be understood, however, that these tables are merely illustrative and other configurations may be provided in other embodiments of the invention.

Figure 14:
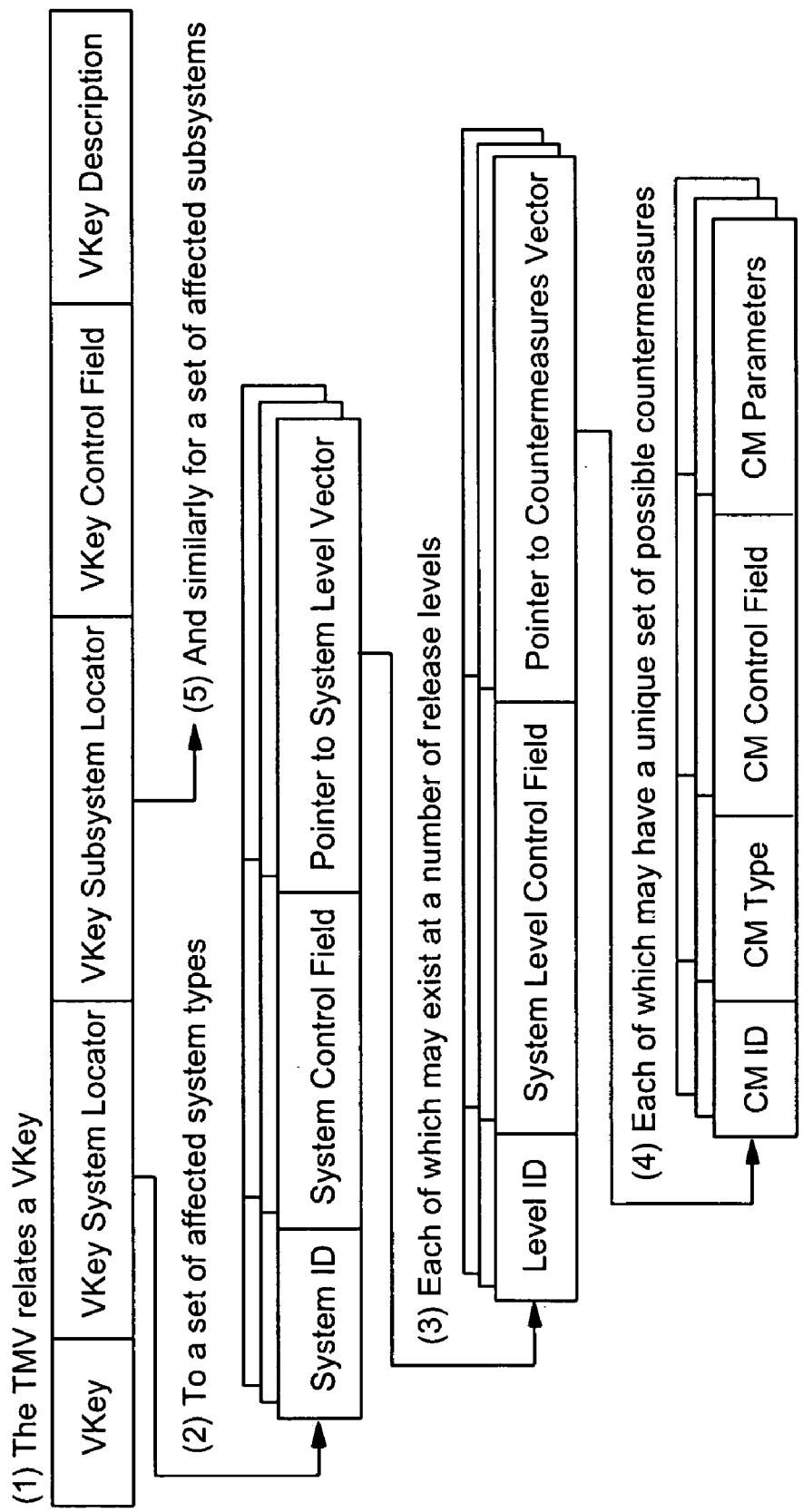

FIG. 14 provides a summary of TMV taxonomy that was described in detail in FIGS. 7-12.

As was described above, the prior applications can consolidate the human interpretation of threat management information to a single point, establish an unambiguous representation of the information using a common semantic information base, and produce a computer-actionable message unit (TMV) suitable for use by an automated threat management system. Vulnerable systems may then identify themselves, apply appropriate countermeasures, track state and engage System Security Administrators (SSAs) only on an "intervention required" basis.

Figure 15:
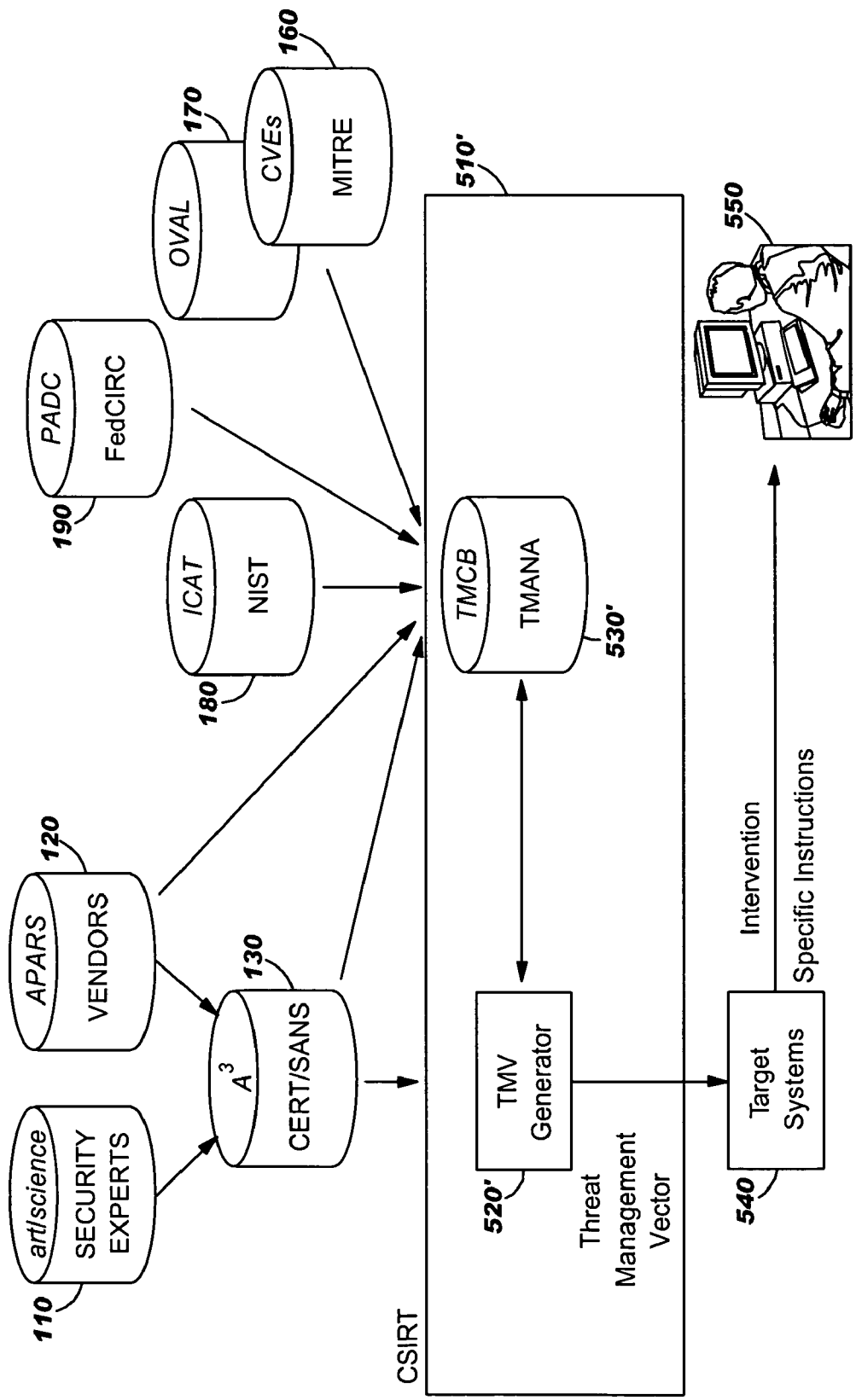
FIG. 15 is a block diagram of systems, methods and/or computer program products for generating computer-actionable computer threat management information according to the prior applications.

FIG. 15 is a block diagram of systems, methods and computer program products for generating computer-readable computer security threat management information according to the prior applications. In FIG. 15, the functionality of the message encoder 520 of FIG. 5 is provided by a TMV generator 520', and the functions of the common semantics metadata 530 is replaced by the TMANA 530', in a CSIRT or central clearing house 510'.

Referring to FIG. 15, the TMV generator 520' transforms vulnerability, threat and APAR information via human analysis and computer-assisted encoding, into an unambiguous computer interpretable form, the TMV. The TMV generator 520' references a set of standard encodings maintained by the TMANA 530' in the form of the TMCB (FIG. 13). While the TMANA 530' maintains the referential integrity of the TMCB, the actual task of assigning values to the standard encodings may be relegated to an external assigned numbers authority, such as NIST. The TMV in computer-readable format is provided to target systems 540. For each specific vulnerability, threat or countermeasure, the TMV stipulates target system components and parameterized countermeasure installation instructions permitting automated application of countermeasures at target computer systems.

In view of the above, some embodiments of the present invention can reduce the need for extensive threat management research and analysis from many points, such as each and every SSA 550, to one point, such as the TMV generator 520'. This can reduce the labor associated with threat management at the operational threat analysis level. Moreover, through its introduction of standard encodings of key data, embodiments of the invention can permit threat management activities at target systems to be automated. This can further reduce the labor associated with threat management at the operational security maintenance level.

Administering Computer Security Threat Countermeasures for Computer Systems

Figure 16:
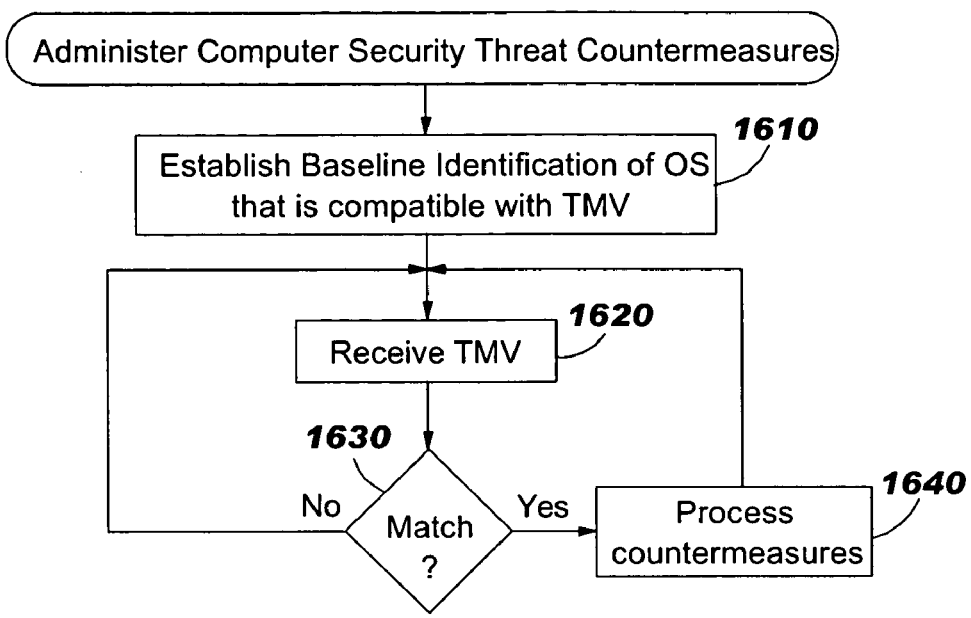
FIG. 16 is a flowchart of operations that may be performed to administer a computer security threat countermeasure according to the prior applications.

FIG. 16 is a flowchart of operations that may be performed to administer computer security threat countermeasures for a computer system according to the prior applications. These operations may be performed in a target system, for example, one of the target systems T of FIG. 2 or one of the target systems 540 of FIG. 5 or 15.

Referring now to FIG. 16, at Block 1610, a baseline identification of an operating system type and an operating system release level for the computer system is established, which is compatible with a TMV. At Block 1620, a TMV is received including therein a first field that provides identification of at least one operating system type that is affected by a computer security threat, a second field that provides identification of an operating system release level for the operating system type, and a third field that provides identification of a set of possible countermeasures for an operating system type and an operating system release level. In other embodiments, the TMV may also include a fourth field that provides identification of at least one application program type that is affected by the computer security threat and a fifth field that provides identification of a release level for the application program type. In these embodiments, the third field also provides identification of a set of possible countermeasures for an application program type and an application program release level. In still other embodiments, the TMV may include a sixth field that provides identification of the computer security threat.

Continuing with the description of FIG. 16, at Block 1630, a determination is made as to whether the TMV identifies the operating system type and operating system release level and/or the application program type and application program release level for the computer system as being affected by the computer security threat. If yes, then countermeasures that are identified in the TMV are processed at Block 1640. If not, then receipt of a new TMV is awaited.

Figure 17:
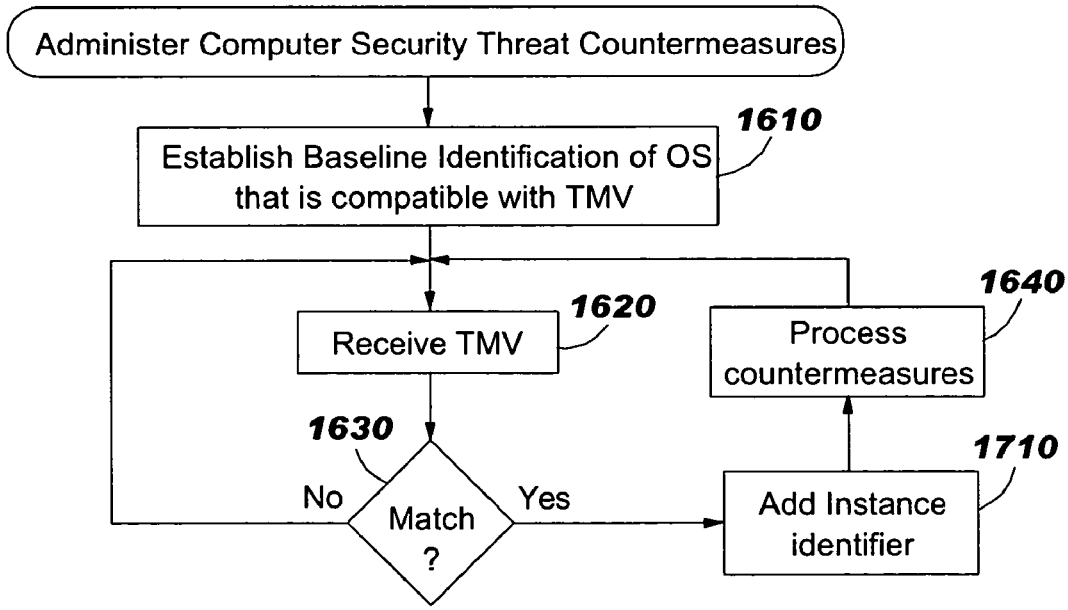
FIG. 17 is a flowchart of operations that may be performed to administer a computer security threat countermeasure according to the prior applications.

FIG. 17 is a flowchart of operations that may be performed to administer computer security threat countermeasures according to the prior applications. Referring to FIG. 17, a baseline identification is established at Block 1610, and a TMV is received at Block 1620. If a match occurs at Block 1630, then at Block 1710, at least one instance identifier is added to the TMV to account for multiple instances of the operating system and/or the application program on board the computer system. Countermeasures are then processed at Block 1640 for the instance of the operating system type and operating system release level and/or the application program type and application program release level when the operating system and/or application program is instantiated in the computer system. Accordingly, these embodiments of the invention can take into account that, in a single computer system, multiple instances of operating systems and/or application programs may be present.

Figure 18:
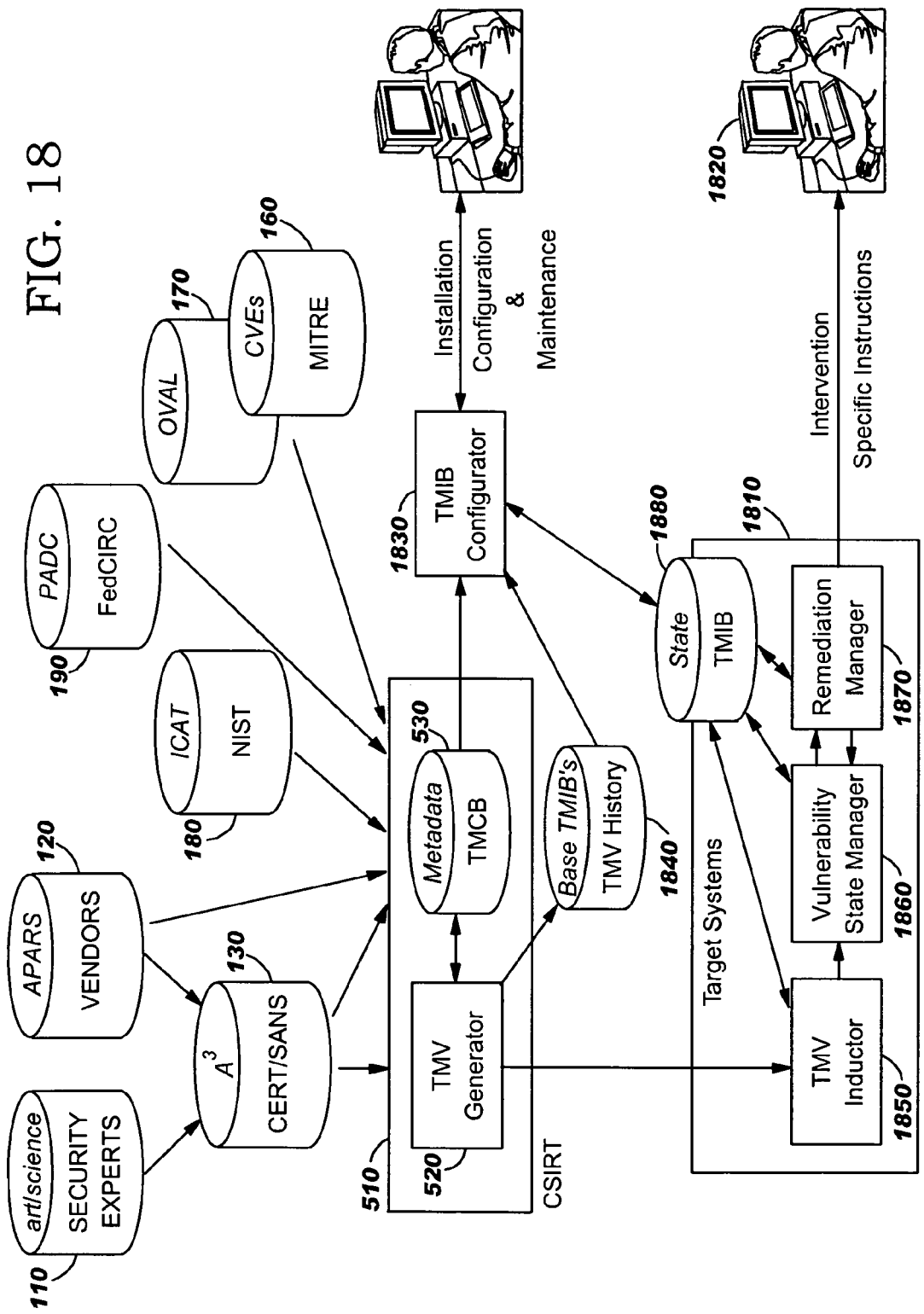
FIG. 18 is a block diagram of systems, methods and computer program products according to the prior applications.

FIG. 18 is a block diagram of systems, methods and computer program products according to the prior applications. As shown in FIG. 18, based on TMV input and tightly coupled side data, a target system 1810 can identify itself as vulnerable to a specific threat or needing a specific countermeasure, automatically initiate appropriate countermeasures, track state and engage security system administrators 1820 on an "intervention required" basis.

Still referring to FIG. 18, at the initiation of security administration personnel or automatic equivalents, a Threat Management Information Base (TMIB) configurator 1830, which utilizes standard values from a Threat Management Control Book (TMCB) 530 of FIG. 13, also referred to as a common semantics database 530 of FIG. 5, also referred to as tightly-coupled side data, establishes a baseline identity and vulnerability state of a target system 1810 using a TMV-compatible information structure and a TMV history file 1840 that is maintained by the TMV generator 520 of FIG. 13, also referred to as a message encoder 520 of FIG. 5.

Still referring to FIG. 18, upon receipt of a new TMV, a TMV inductor 1850 checks the TMIB to see if any onboard system/subsystem images are affected. If so, the TMV inductor 1850 prunes the TMV of nonrelevant TMV subvectors and forwards it to a Vulnerability State Manager (VSM) 1860 for processing.

The VSM 1860 incorporates the new vulnerability or countermeasure information into the TMIB 1880 and, using state information from the TMIB 1880, if any relevant system or subsystem images are active (instantiated), invokes the Remediation Manager (RM) 1870 to oversee the application of the indicated countermeasures. During the remediation, the remediation manager 1870 interacts with the TMIB 1880 to maintain current vulnerability state and countermeasure application. The VSM 1860 may similarly invoke the Remediation Manager 1870 upon system/subsystem initial program load. Accordingly, a self-healing capability can be provided in computer systems with respect to security threat management.

Figure 19:
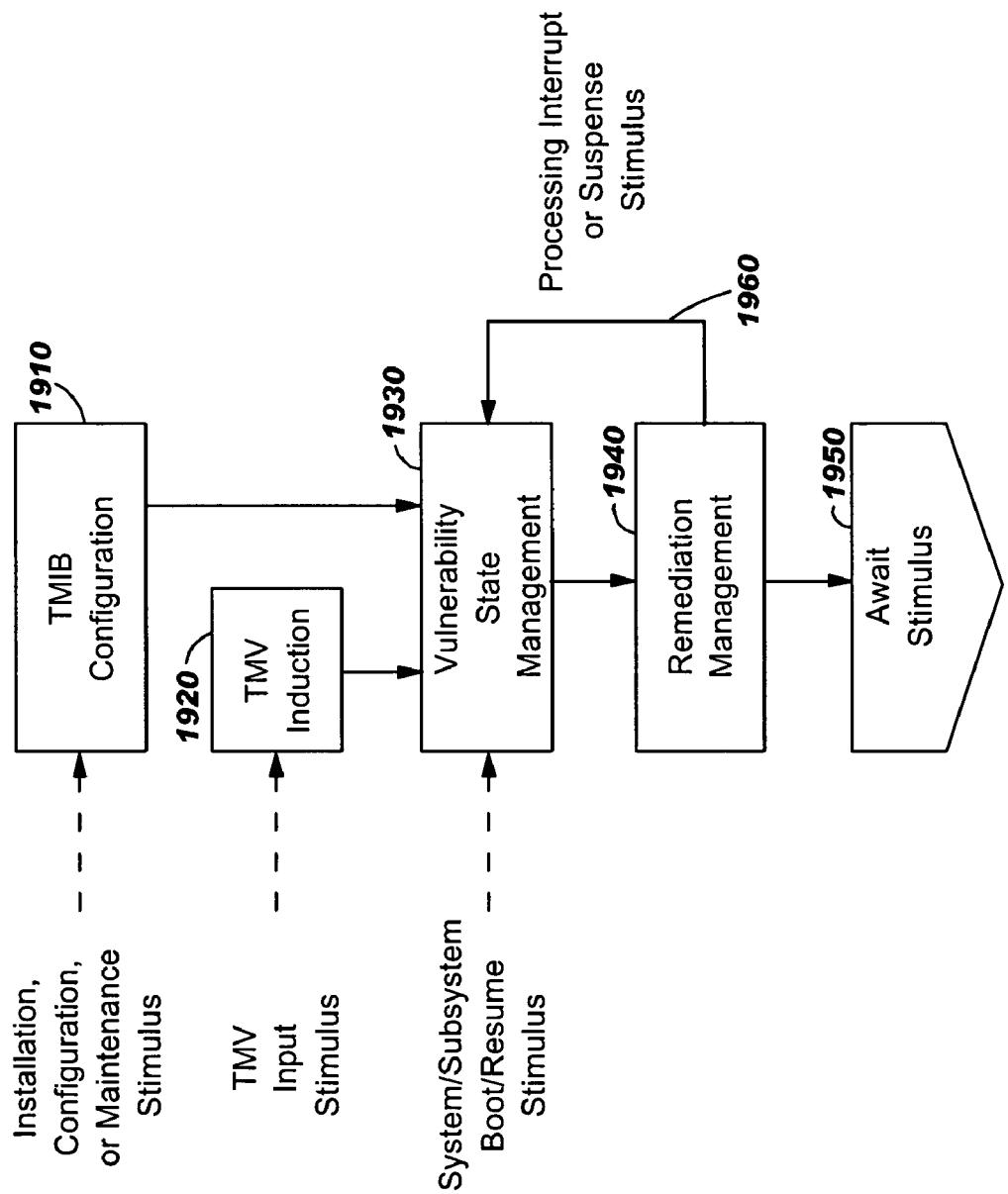
FIG. 19 is a flowchart of operations that may be performed to administer a computer security threat countermeasure according to the prior applications.

FIG. 19 is a flowchart of operations that may be performed to administer computer security threat countermeasures to a computer system according to the prior applications, and will refer to the block diagram of FIG. 18. Referring to FIG. 19, at Block 1910, TMIB configuration is performed upon receipt of an installation, configuration or maintenance stimulus. TMIB configuration can obtain all prior countermeasures for the system, also referred to as a TMV history file, so that the system can be brought up to date against all prior security threats. TMIB configuration will be described in detail below. At Block 1920, TMV induction is performed in response to a new TMV input stimulus, as will be described below. At Block 1930, whether in response to TMIB configuration Block 1910, TMV induction Block 1920, or a system/subsystem boot or resume stimulus, vulnerability state management of Block 1930 is performed to allow all TMVs to be processed. Remediation management is performed at Block 1940 to process the countermeasures that are identified in the TMVs. Vulnerability state management 1930 may maintain the proper state of the computer system even upon occurrence of a processing interrupt or suspense stimulus 1960. After remediation management is performed at Block 1940, a new stimulus such as an installation configuration or maintenance stimulus, a TMV input stimulus, a system/subsystem boot/resume stimulus or a processing interrupt or suspense stimulus is awaited at Block 1950.

TMIB configuration according to the prior applications now will be described. TMIB configuration may be performed by TMIB configurator 1830 of FIG. 18, and/or the TMIB configuration Block 1910 of FIG. 19. TMIB configuration can build an information structure that definitively specifies an initial and continuing software configuration and vulnerability state of a target system, such that the TMIB 1880 is readily usable for computation comparison with a subsequent inbound TMV to determine whether or not the target system is one of the system or subsystem types to which the TMV should be directed. This can provide rapid recognition, to efficiently match TMV system/subsystem type and level information with on-board system/subsystem type and level information. Moreover, remediation management based on initial TMIB configuration can be virtually identical to the subsequent processing of inbound TMVs during steady state operation, to allow computational consistency.

In some embodiments, the initial configuration of the TMIB 1880 can be computationally equivalent to that derived by processing TMVs with all the vulnerability and countermeasure information to establish an initial non-vulnerable state. Stated differently, all countermeasures historically identified as relevant to the system/subsystem being initialized can be applied, in bulk mode. Subsequent inbound TMV information can then be incorporated into the TMIB 1880 by a simple computational means due to notational consistency.

Thus, according to the prior applications, the TMV generator 520, upon issuing TMVs, maintains a history file 1840 in the form of TMIB entries representing the history of applicable countermeasures for applicable vulnerabilities to applicable systems and subsystems. TMIB fabrication, the construction of TMV history file entries, and the TMV induction operation can all be closely related. In particular, they can all involve well-defined transforms on the TMV structure, as described below.

Figure 20:
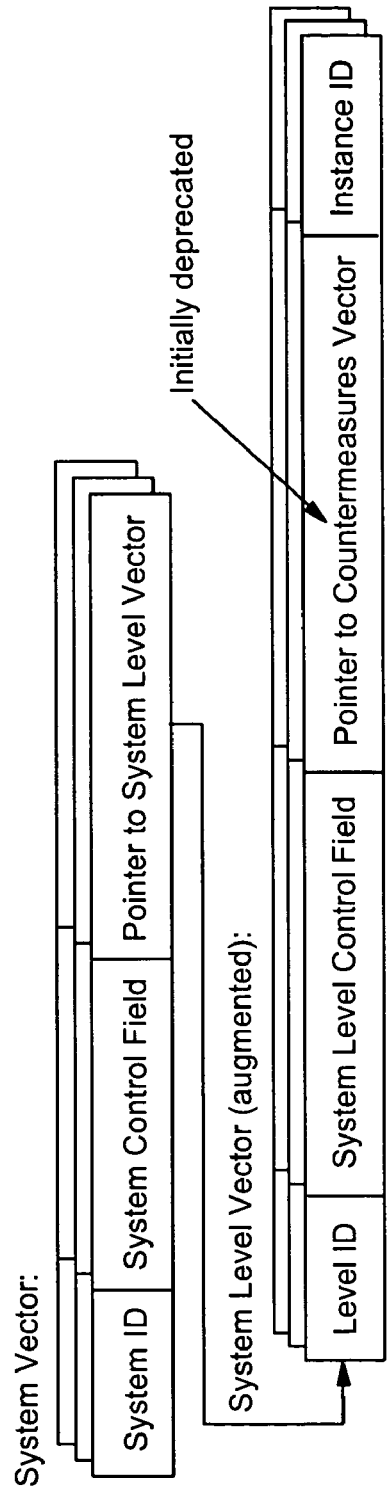
FIGS. 20-22 illustrate threat management vectors according to embodiments of the present invention as they undergo TMV mutation according to the prior applications.
Figure 21:
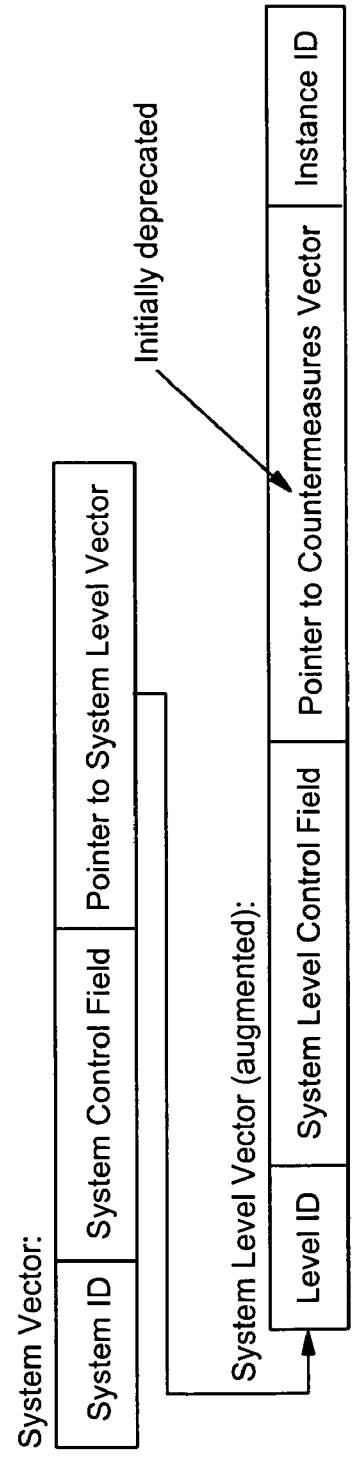
Figure 22:
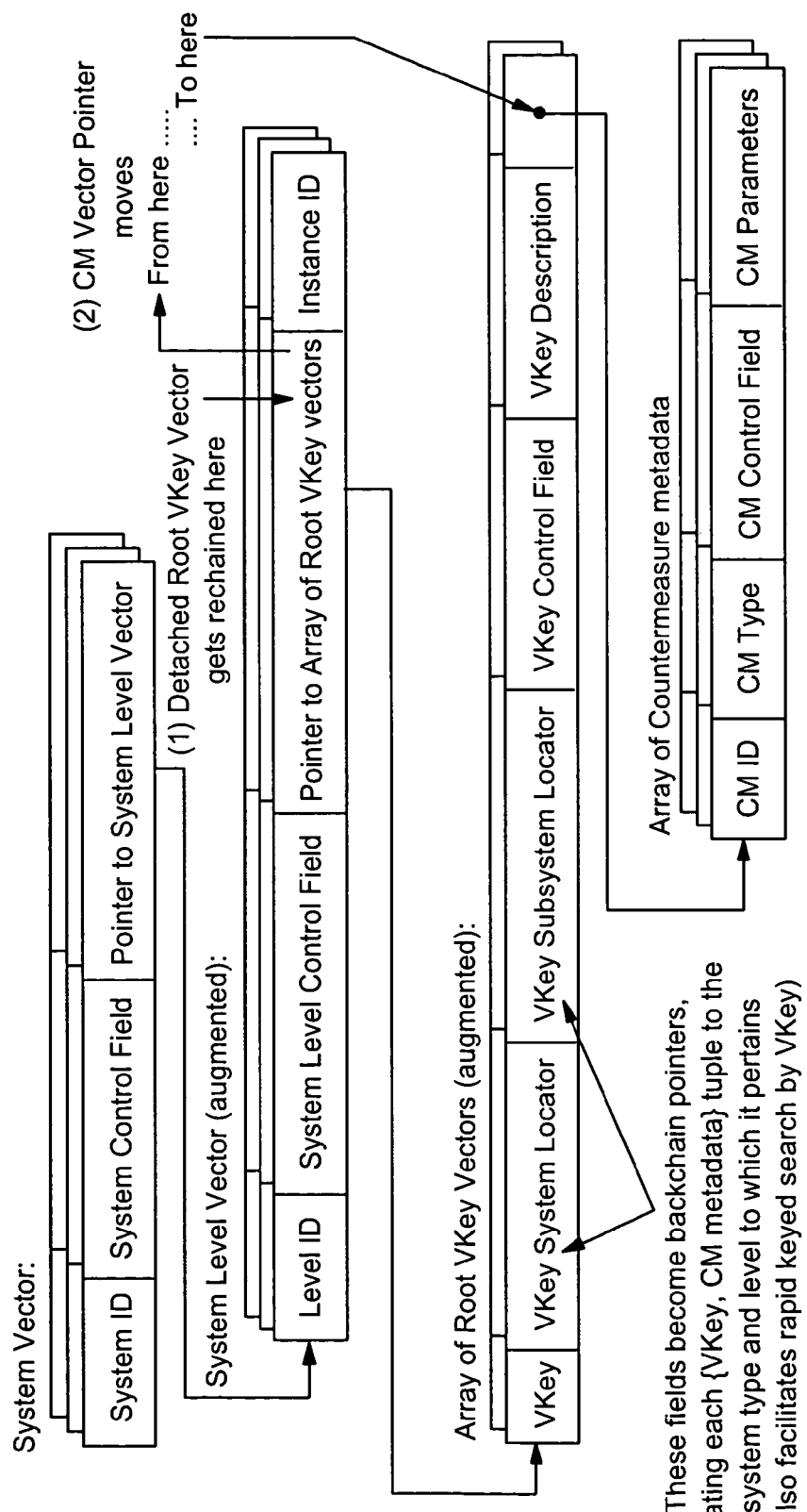

TMIB generation may take place using a process, referred to herein as "TMV mutation", as described in FIGS. 20-22. As shown in FIG. 20, a system vector (for operating systems), or subsystem vector (for applications), is extracted from the root TMV. Moreover, the subordinate system level vector is augmented with an "instance ID" field, to represent a specific system instance, such as a host name and/or IP address. This forms a virgin TMIB structure that identifies a system or subsystem. It will be understood that FIG. 20 illustrates the system vector case, but a similar taxonomy may be used for a subsystem vector.

The taxonomy shown in FIG. 20 can represent a highly sophisticated system. For example, the system illustrated in FIG. 20 has three bootable system types with three available boot images of the first system type, one for each of three release levels of that system type. Machine architectures supporting multiple concurrent Logical PARtitions (LPAR) may fall into this categories. Systems with multiple boot images may be somewhat simpler. The simplest systems have a single boot image, as depicted in FIG. 21.

As shown in FIG. 22, the root VKey vector is then rechained by replacing the countermeasures vector with a pointer to an array of root Vkey vectors and augmenting each root VKey vector with a countermeasures vector pointer field. This creates the basic structure of a TMV history record, a TMIB fully populated with VKey, and countermeasure state data, and an inducted TMV as shown in FIG. 22. It will be understood that FIG. 22 shows the data structure for a system. However, a structure for a subsystem can be similar. In practical effect, the TMV mutation can transform the TMV from a desired language of a sender to a desired language of a receiver.

Figure 23:
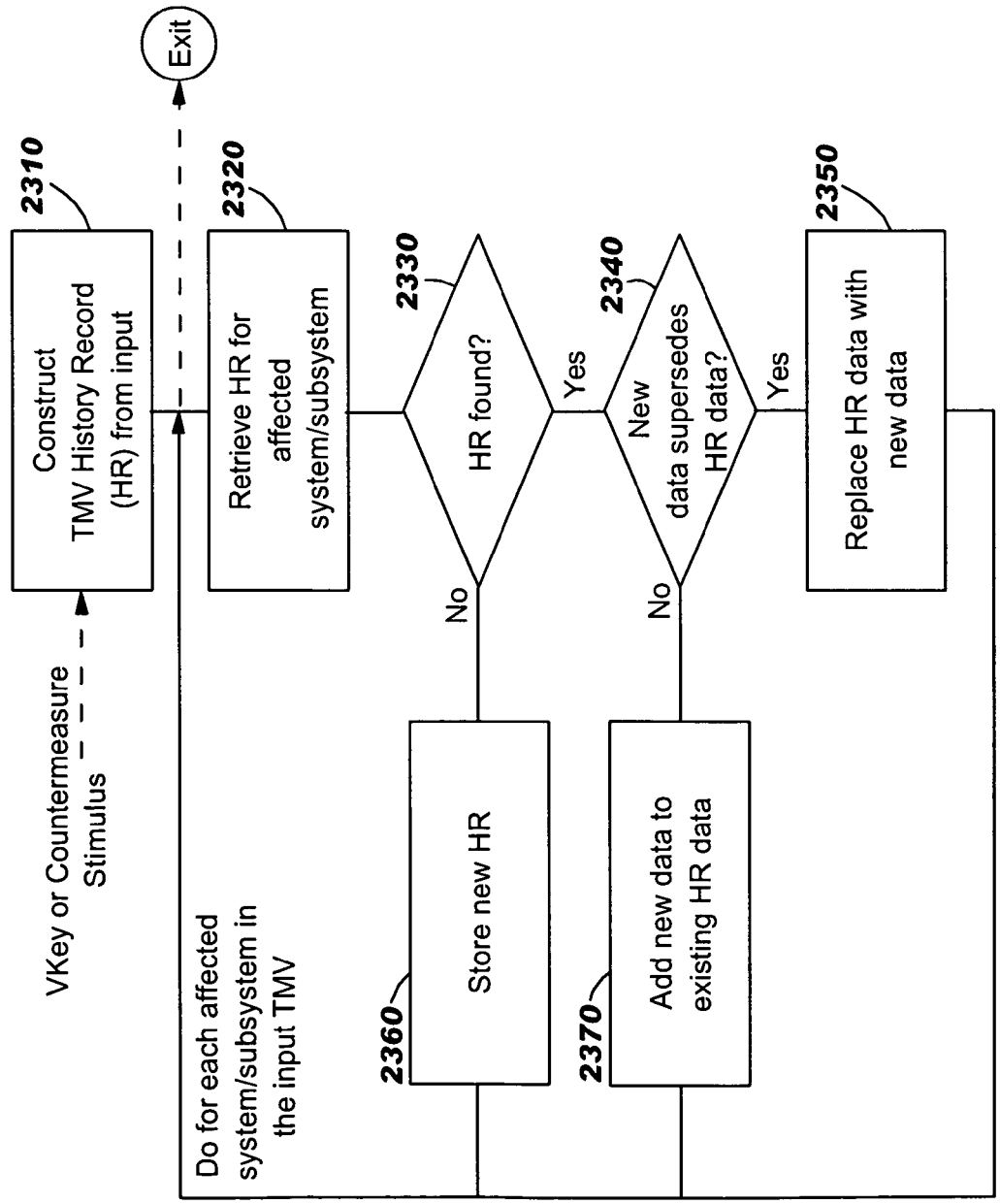
FIG. 23 is a flowchart of operations that may be performed for TMV history file maintenance according to the prior applications.
Figure 24:
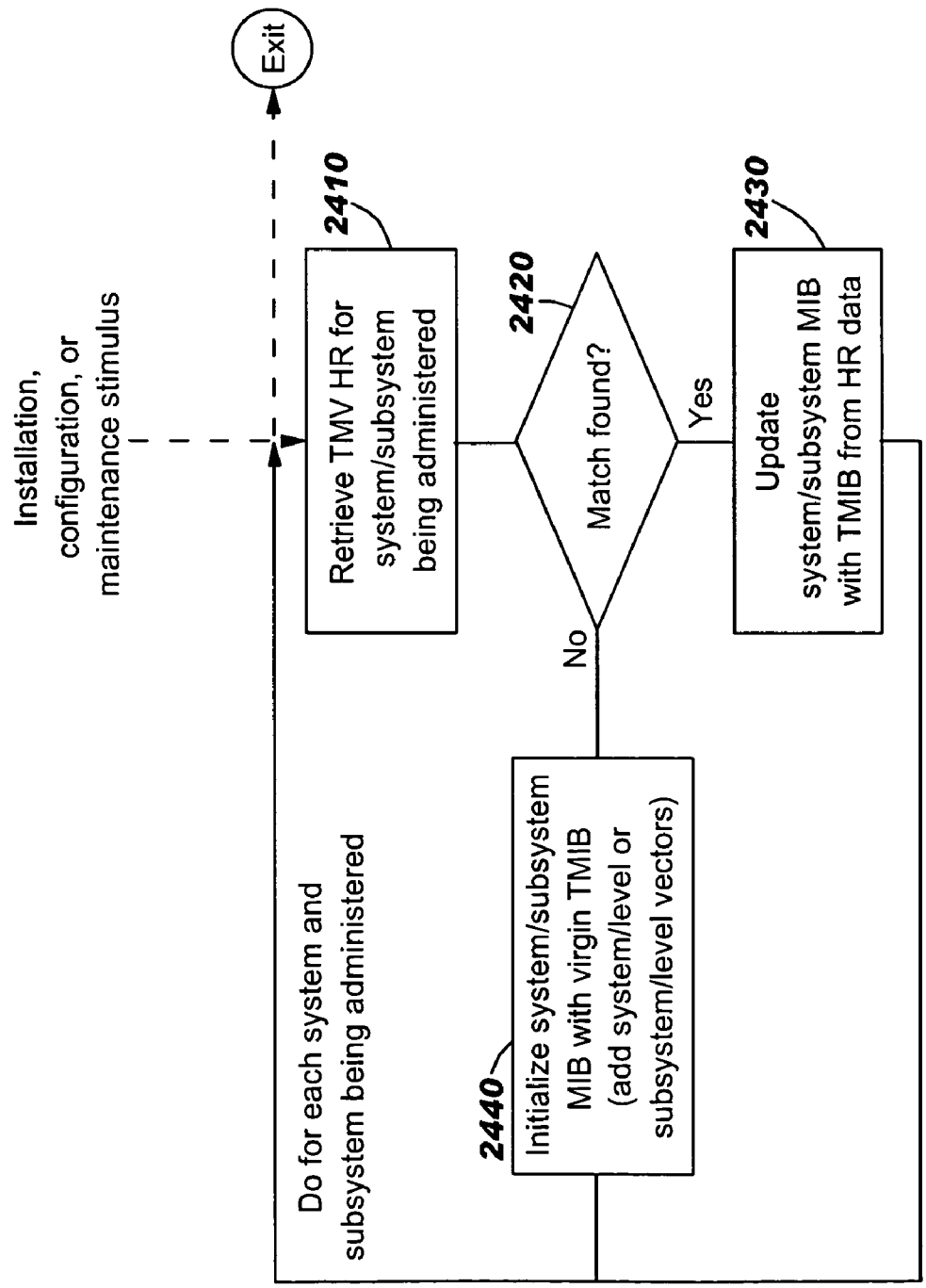
FIG. 24 is a flowchart of operations that may be performed for TMIB configuration according to the prior applications.
Figure 25:
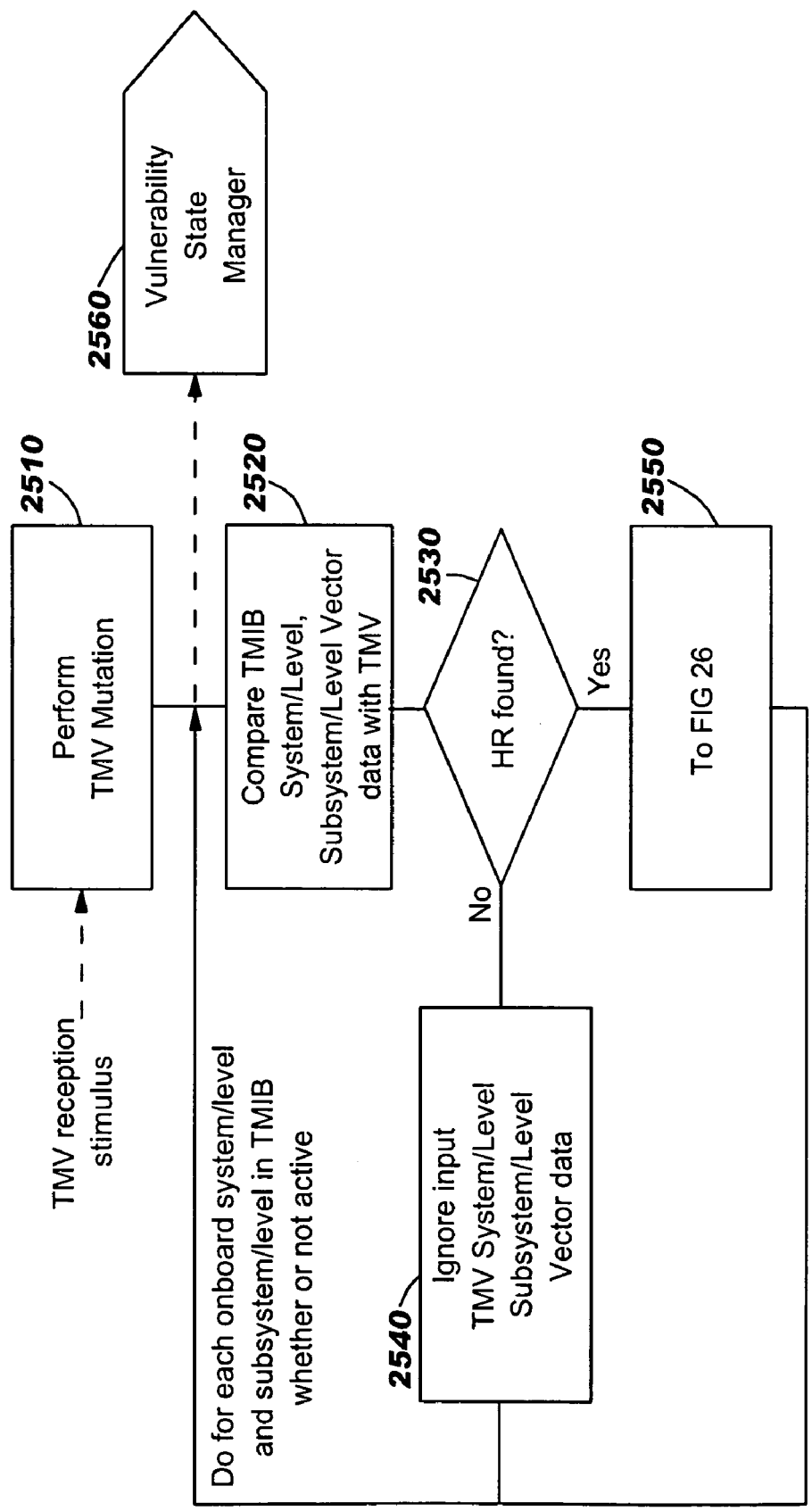
FIGS. 25 and 26 are flowcharts of operations that may be performed for TMV induction according to the prior filed applications.
Figure 26:
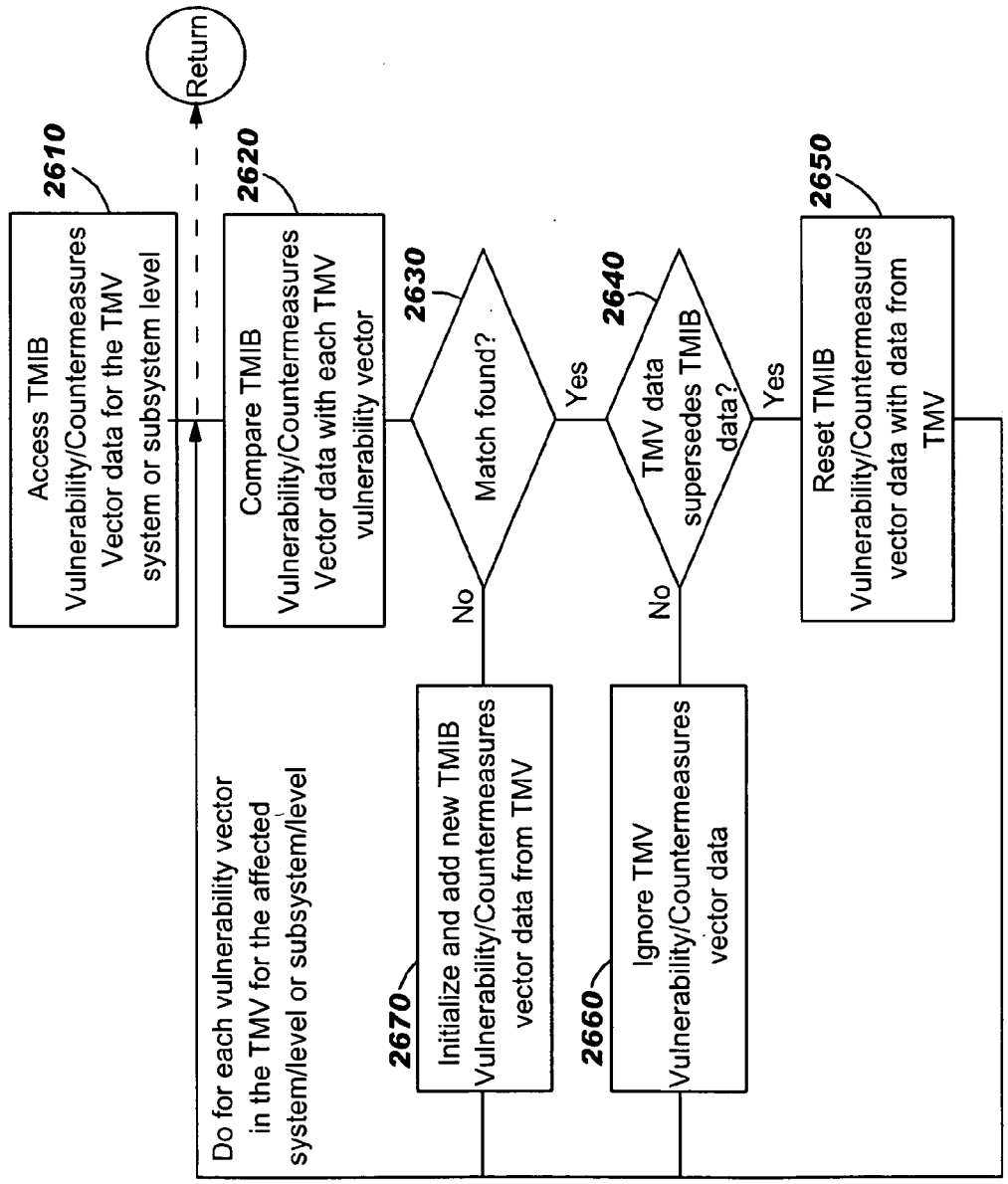
Figure 27:
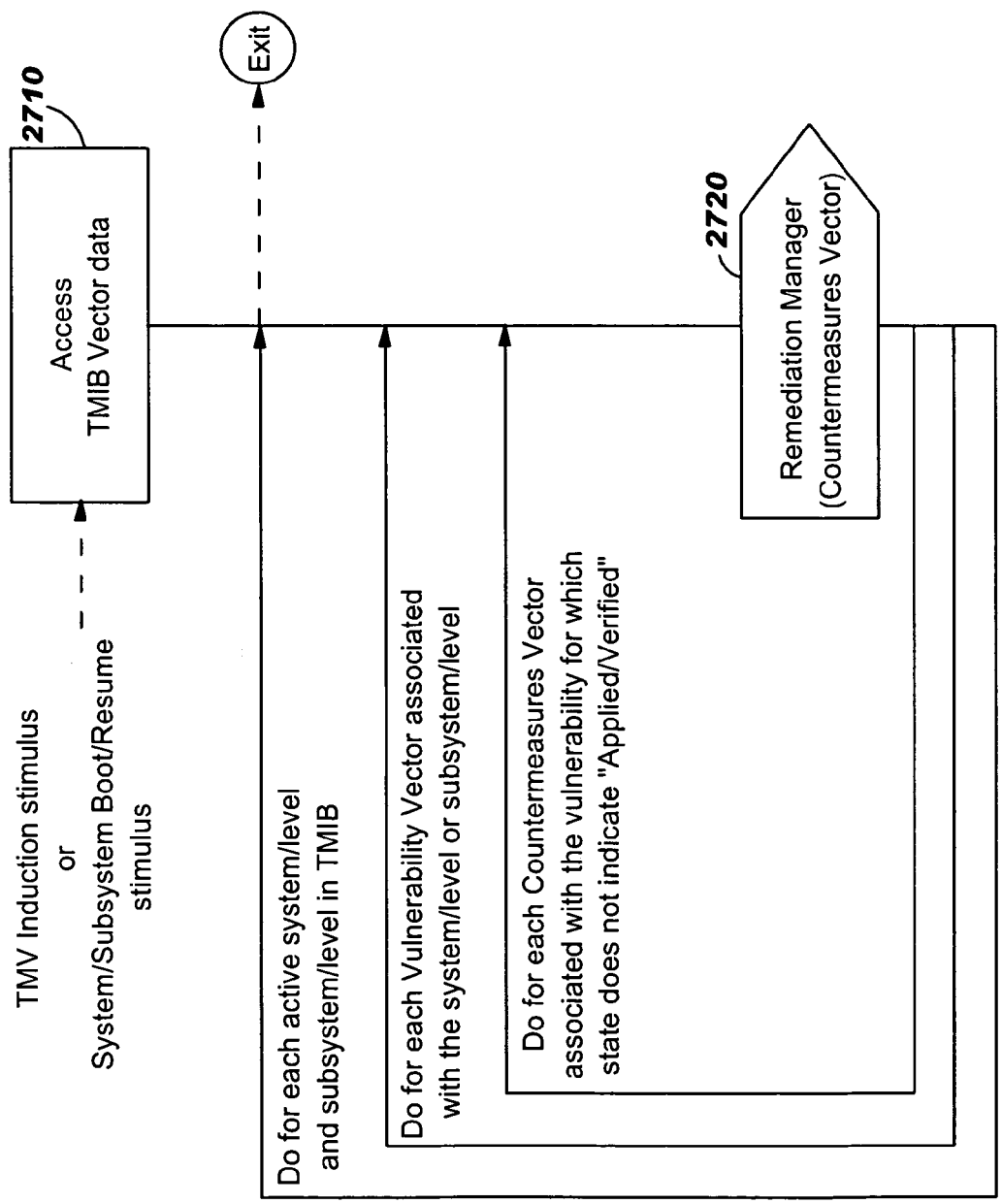
FIG. 27 is a flowchart of operations that may be performed for vulnerability state management according to the prior applications.
Figure 28:
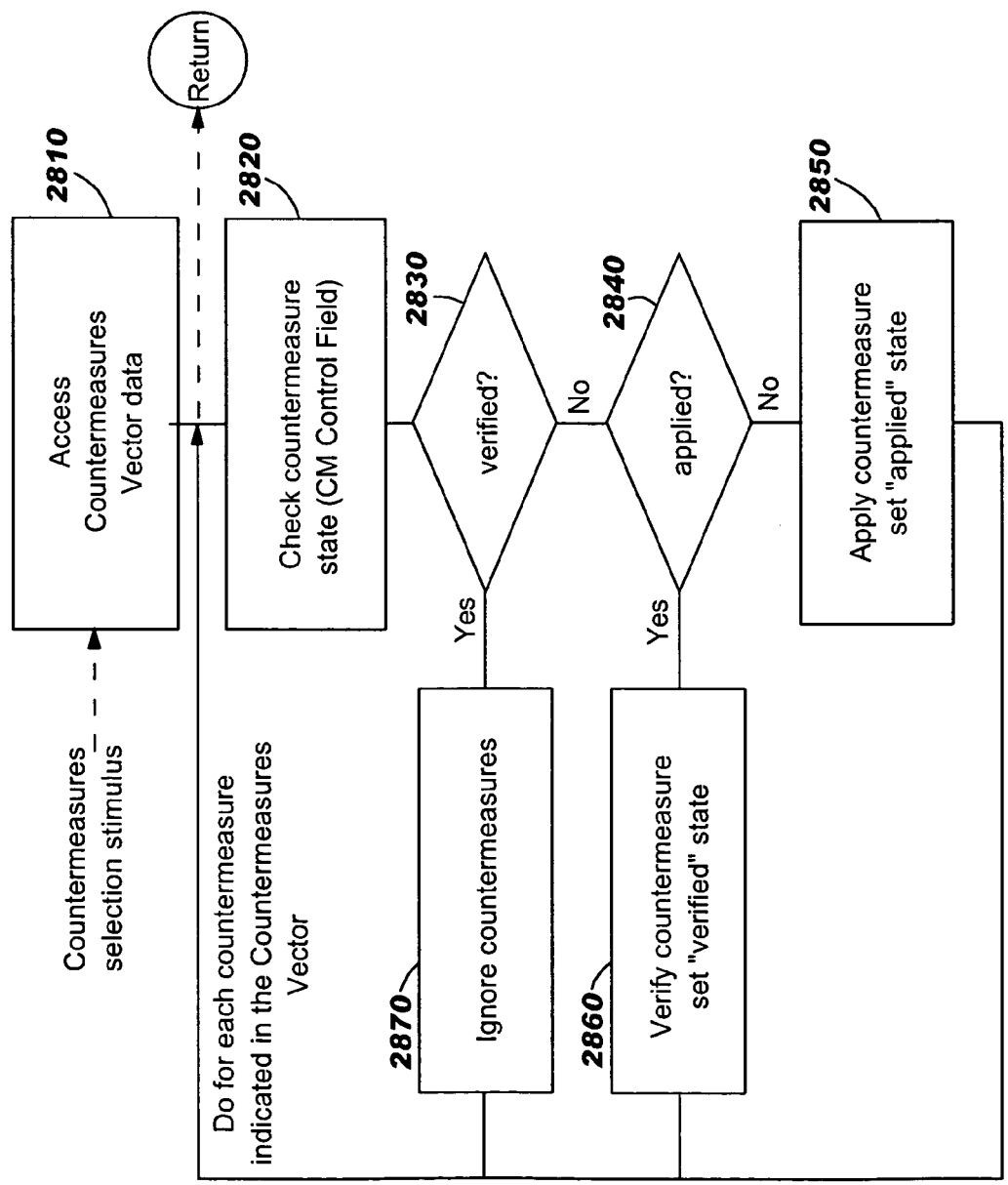
FIG. 28 is a flowchart of operations that may be performed for remediation management according to the prior applications.

FIG. 23 is a flowchart of operations that may be performed for TMV history file maintenance according to the prior applications. These operations may be performed by the TMV generator 520 of FIG. 18. Referring to FIG. 23, at Block 2310, a TMV History Record (HR) is constructed from a VKey or countermeasure stimulus. At Block 2320, an HR is retrieved for the affected system or subsystem. If an HR is found at Block 2330, and if the new data supercedes the HR data at Block 2340, then the HR data is replaced with the new data at Block 2350. These operations are performed for each affected system/subsystem in the input TMV. If an HR is not found at Block 2330, then the new HR is stored at Block 2370. If the HR was found at Block 2330, but the new data does not succeeded the HR data, then the new data is added to the existing HR data at Block 2360.

Referring now to FIG. 24, operations for TMIB configuration will now be described according to the prior applications. These operations may be performed by the TMIB configurator 1830 of FIG. 18 and/or by TMIB configuration Block 1910 of FIG. 19. Referring now to FIG. 24, upon occurrence of an installation, configuration or maintenance stimulus, the TMV HR for the system/subsystem being administered is retrieved at Block 2410. If an HR is found at Block 2420, then the system/subsystem MIB is updated with the TMIB from the HR data at Block 2430. The update may be performed so as not to corrupt existing relevant vulnerability state management information for the system/subsystem. If not, then at Block 2440, the system or subsystem MIB is initialized with a virgin TMIB. The operations of Blocks 2410-2440 are performed for each system and subsystem that is being administered.

FIGS. 25 and 26 are flowcharts of operations that may be performed for TMV induction according to the prior applications. These operations may be performed by TMV inductor 1850 of FIG. 18 and/or TMV induction Block 1920 of FIG. 19. Referring now to FIG. 25, upon receipt of the TMV stimulus, TMV mutation, as was described above, is performed at Block 2510. At Block 2520, the TMIB system/level subsystem/level vector data is compared with the TMV. If a match is found at Block 2530, then a potentially vulnerable system/level or subsystem/level identified in the TMV has been determined to be on board. Operations proceed to FIG. 26 at Block 2550, to determine the actual vulnerability. On the other hand, if at Block 2530 no match was found, then at Block 2540, the input TMV is ignored. Operations of Blocks 2520, 2530, 2540 and 2550 may be performed for each on board system/level and subsystem/level in the TMIB, whether or not active. Operations then proceed to a vulnerability state manager at Block 2560, which will be described in connection with FIG. 27.

Referring now to FIG. 26, at Block 2610, in response to identification of a potentially vulnerable system/level or subsystem/level in a TMV at Block 2550, the TMIB vulnerability/countermeasures vector data for the TMV system or subsystem level is accessed. At Block 2620, the TMIB vulnerability/countermeasures vector data is compared with each TMV vulnerability vector. If a match is found at Block 2630, and if the TMV data supercedes the TMIB data at Block 2640, then at Block 2650, the TMIB vulnerability/countermeasures data is reset with data from the TMV. On the other hand, if a match is not found at Block 2630, then the new TMIB vulnerability countermeasures vector data from the TMV is added at Block 2670. Alternatively, if a match is found but the TMV data does not succeeded the TMIB data, then at Block 2660, the TMV vulnerability/countermeasures vector data can be ignored. The operations at Blocks 2620-2670 may be performed for each vulnerability vector in the TMV for the affected system/level or subsystem/level.

FIG. 27 is a flowchart of operations that may be performed for vulnerability state management according to the prior applications. These operations may be performed by the vulnerability state manager 1860 of FIG. 18 and/or the vulnerability state management Block 1930 of FIG. 19. Referring now to FIG. 27, at Block 2710, in response to a TMV induction stimulus or a system/subsystem boot or resume stimulus, TMIB vector data is accessed. At Block 2720, the remediation manager is called, as will be described in FIG. 28. Operations of Block 2710 and Block 2720 may be performed for each active system/level and subsystem/level in the TMIB, for each vulnerability vector associated therewith, and for each countermeasures vector associated with the vulnerability for which a state does not indicate "applied/verified".

Referring now to FIG. 28, operations for remediation management according to the prior applications will now be described. These operations may be performed by the remediation manager 1870 of FIG. 18 and/or the remediation management Block 1940 of FIG. 19. Referring to FIG. 28, in response to countermeasures selection stimulus, countermeasures vector data is accessed at Block 2810. The countermeasure state is checked by checking the CM control field at Block 2820. If verified at Block 2830, then the countermeasure is ignored at Block 2870. If the countermeasure is not verified, but is applied at Block 2840, then the countermeasure is verified and set to the "verified" state. If the countermeasure is not applied at Block 2840, then the countermeasure is applied and is set to the "applied" state at Block 2850. The operations of Blocks 2820-2870 may be performed for each countermeasure indicated in the countermeasures vector.

As described above, the prior applications can permit a computer system to become autonomic (self-healing) to a large degree. This can reduce the human labor associated with the application of security patches, and the associated labor costs. Because of the autonomic characteristics of the prior applications, security patches may be applied more rapidly, which can reduce exposure time duration and the corresponding aggregate costs associated with recovering from system penetration attempts.

Administration of Computer Security Threat Countermeasures Across a Domain of Target Computer Systems.

In the prior applications, a central operational component (sometimes referred to as a Threat Management Vector (TMV) generator) distributes to each target system a vector containing information that those systems use to assess their vulnerability state and apply an appropriate set of countermeasures with reduced or minimized human intervention. Each target system can operate autonomously on its input, applying appropriate countermeasures as determined by the input and by the target system's current configuration, and can maintain state information regarding the progress of remedial actions. Embodiments of the present invention that will now be described can provide a Threat Management Domain Controller (TMDC) that can selectively distribute TMVs to a domain of target computer systems. The TMDC is responsive to a TMV and is configured to process a TMV that is received for use by the domain of target computer systems and to transmit the TMV that has been processed to at least one of the target computer systems in the domain of target computer systems. Accordingly, some embodiments of the present invention can potentially improve operational efficiency of TMV distribution and/or TMV processing at target systems.

Figure 29:
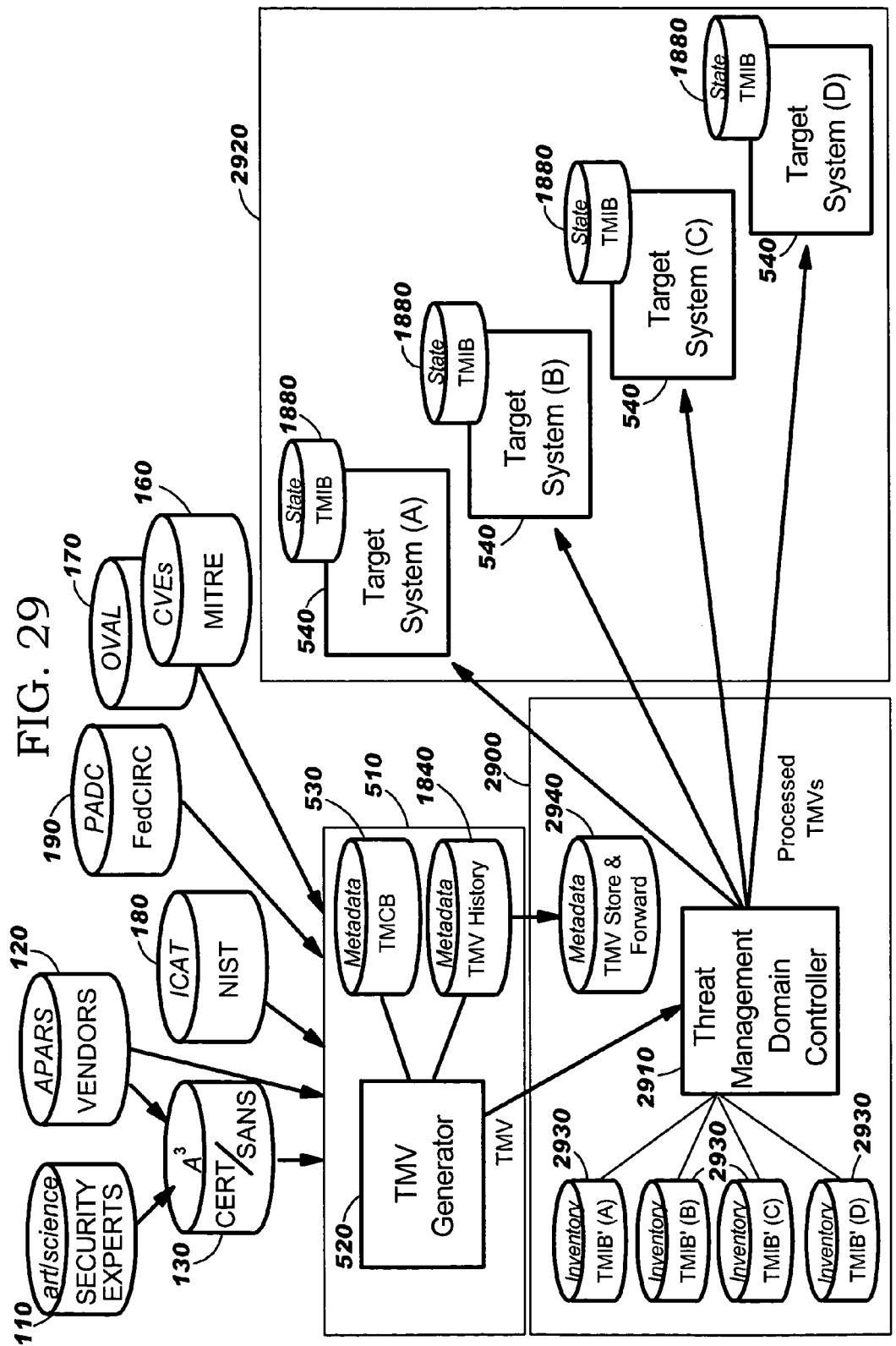
FIG. 29 is a block diagram of systems, methods and computer program products for administration of computer security threat countermeasures to a domain of target computer systems according to embodiments of the present invention.

FIG. 29 is a block diagram of domain controlling systems, methods and/or computer program products for administration of computer security threat countermeasures to a domain of target computer systems according to embodiments of the present invention. As shown in FIG. 29, a TMDC 2910 is responsive to a computer-actionable TMV that is generated by a TMV generator 520. The TMDC 2910 is configured to process a TMV that is received for use by a domain 2920 of target computer systems 540 and to transmit the processed TMVs to at least one of the target computer systems 540 in the domain 2920 of target computer systems 540.

Continuing with the description of FIG. 29, the TMDC 2910 can reside on one or more enterprise, application, personal, pervasive and/or embedded computer systems 2900 and may operate at least in part on the same computer system 510 that runs the TMV generator 520 and/or one or more of the target systems 540 in the domain 2920. The TMDC 2910 operates within the administrative domain 2920 of a collection of target systems 540. The TMDC 2910 can mediate between the TMV generator 520 and the target computer systems 540. In some embodiments, the TMDC can reduce or eliminate the need for the TMV generator 520 to maintain knowledge of target computer system identities, configurations and/or operational status. In some embodiments, the TMDC 2910 can improve or optimize bandwidth that is used for TMV transmission and/or the utilization of network infrastructure components for TMV transmission. In some embodiments, the TMDC 2910 can reduce or minimize I/O subsystem, buffer storage and/or CPU utilization at target systems 540 for processing of TMVs. Moreover, in some embodiments, the TMDC 2910 can provide a central source for target system program instance inventory information.

In some embodiments, rather than sending TMVs to each target system 540 individually, the TMV generator 520 sends TMVs to one or more TMDCs 2910. Each TMDC in turn can reliably forward to each target computer system 540 in its domain 2920 only those TMV elements that may be appropriate to the specific target system environment. This capability can be provided at least in part based on the instantiation at the TMDC of real or near real time replicas of TMIB data 2930 associated with each target system 540. It also will be understood that although FIG. 29 illustrates a single TMDC 2910 and four target systems A-D, other embodiments of the invention may provide multiple TMDCs 2910, each of which may be associated with one or more target systems 540.

As was noted above, according to some embodiments of the present invention, the TMDC is configured to process a TMV that is received, for use by a domain of target computer systems and to transmit the TMV that has been processed to at least one of the target computer systems in the domain of target computer systems. In some embodiments, this processing and transmitting is performed by selectively transmitting the TMV that is received to the at least one of the target computer systems if the TMV applies to the at least one of the target computer systems. In other embodiments, this processing and transmitting is provided by selectively transmitting selected TMV fields in the TMV that is received to the at least one of the target computer systems. In still other embodiments this processing and transmitting is performed by mutating the TMV that is received to a format that is compatible with the domain of target systems. In yet other embodiments this processing and transmitting is performed by generating a Program Instance (PI) vector that identifies a program instance at a selected one of the target computer systems and by transmitting the TMV, including the PI vector, to the selected one of the target computer systems. In still other embodiments, this processing and transmitting is performed by transmitting TMVs that were not previously transmitted to a program instance at a target computer system due to unavailability of the program instance, upon availability of the program instance. In still other embodiments, this processing and transmitting is provided by storing a TMV until the TMV has been provided to all program instances at the domain of target computer systems and to purge the TMV thereafter. These various embodiments will be described in detail below.

Mutation of a TMV by a TMDC according to some embodiments of the present invention now will be described. In the prior applications, the TMV generator created a form of TMV that may be optimized to represent information in a form most suitable for computation by the sender. Target systems receiving TMVs then performed a "mutation" on the input to create a form a TMV that may be optimized to represent information in a form most suitable for computation by the receiver, the target system itself.

In contrast, according to some embodiments of the present invention, a TMV mutation is performed by the TMDC 2910 on behalf of the target systems 540 within its domain 2920. The mutated TMV may be augmented with an inventory-management-oriented data structure, for example, by virtue of a specialization of the "Instance ID" field of the mutated TMV that was described in the prior applications. This TMV data structure may be used by both the TMDC and target systems within its domain, in coordinated fashion, to govern the installation of countermeasures at target computer systems. As part of its mediation function, which may be made possible by the replication of portions of the TMIBs 1880 from the target systems to TMIB' 2930 at the TMDC 2910, the TMDC 2910 customizes the TMV contents sent to each target system 540 such that only those TMV data elements relevant to a specific target system may be received by that target system.

Figure 30:
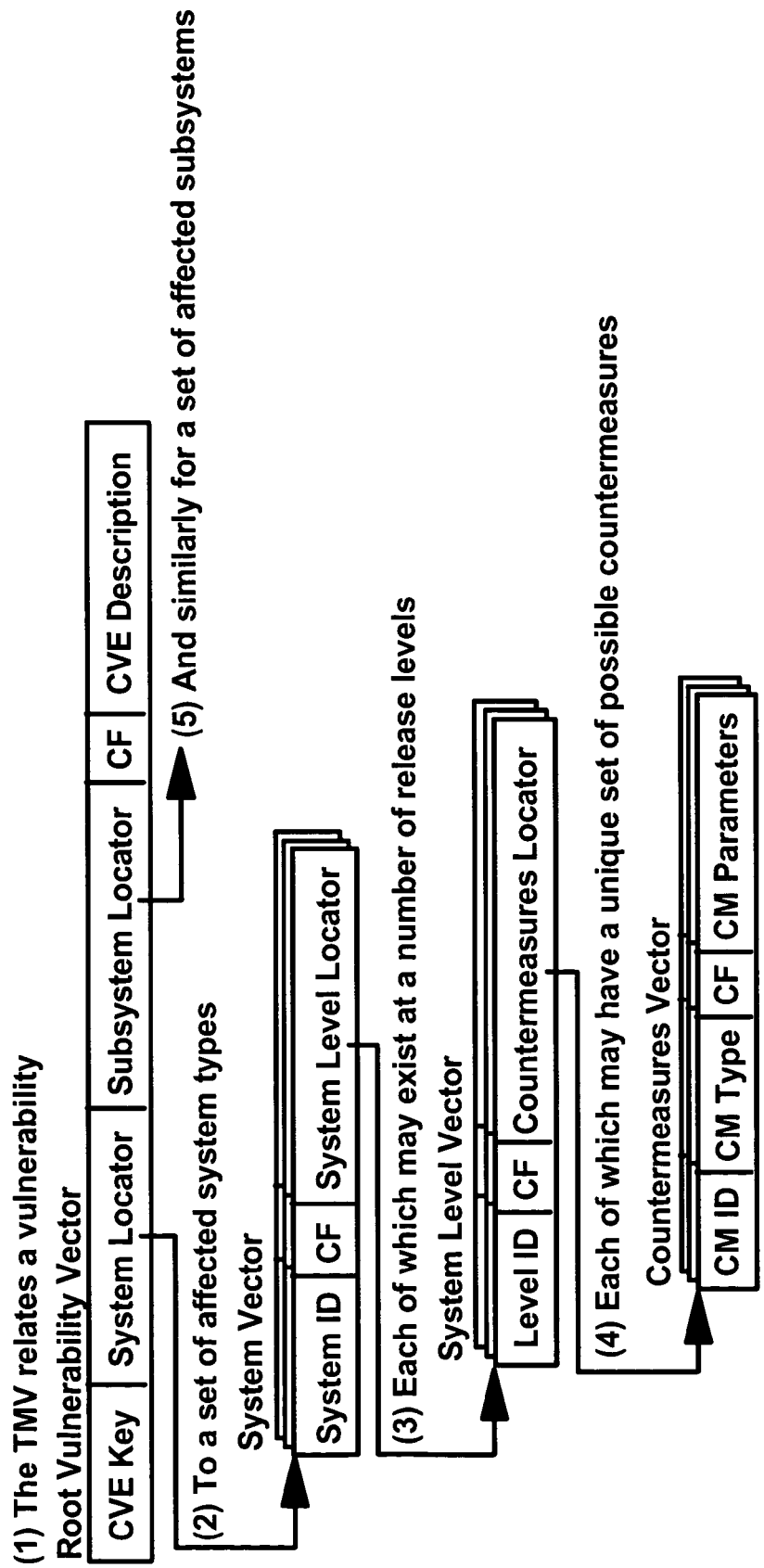
FIGS. 30 and 31 illustrate detailed data structures of threat management vectors and mutated threat management vectors according to the prior applications.

FIG. 30 illustrates an overall taxonomy of a TMV as was described extensively in the prior applications. In FIG. 30, some vector field names have been simplified and vector control fields are designated "CF". Moreover, the Root Vulnerability Vector was also referred to as a "Root CVE Vector" in the prior applications.

Figure 31:
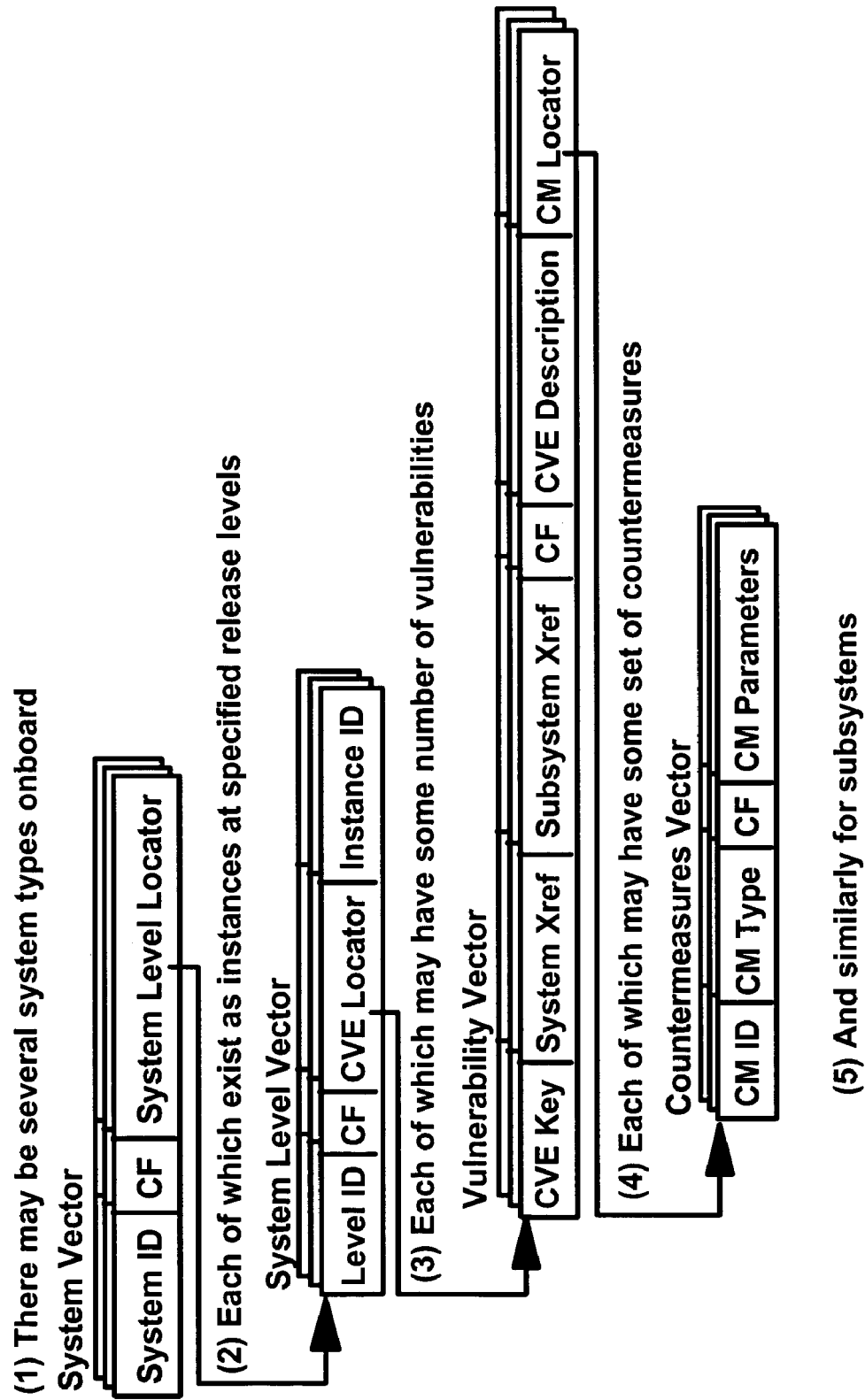

As was also described in the prior applications, the target systems performed a mutation on the TMV to create a form that may be optimized to represent information in a form most suitable for computation by the receiver. FIG. 31 illustrates a taxonomy of a mutated TMV of the prior applications. Again, some vector field names are simplified and the vector control fields are designated "CF".

Figure 32:
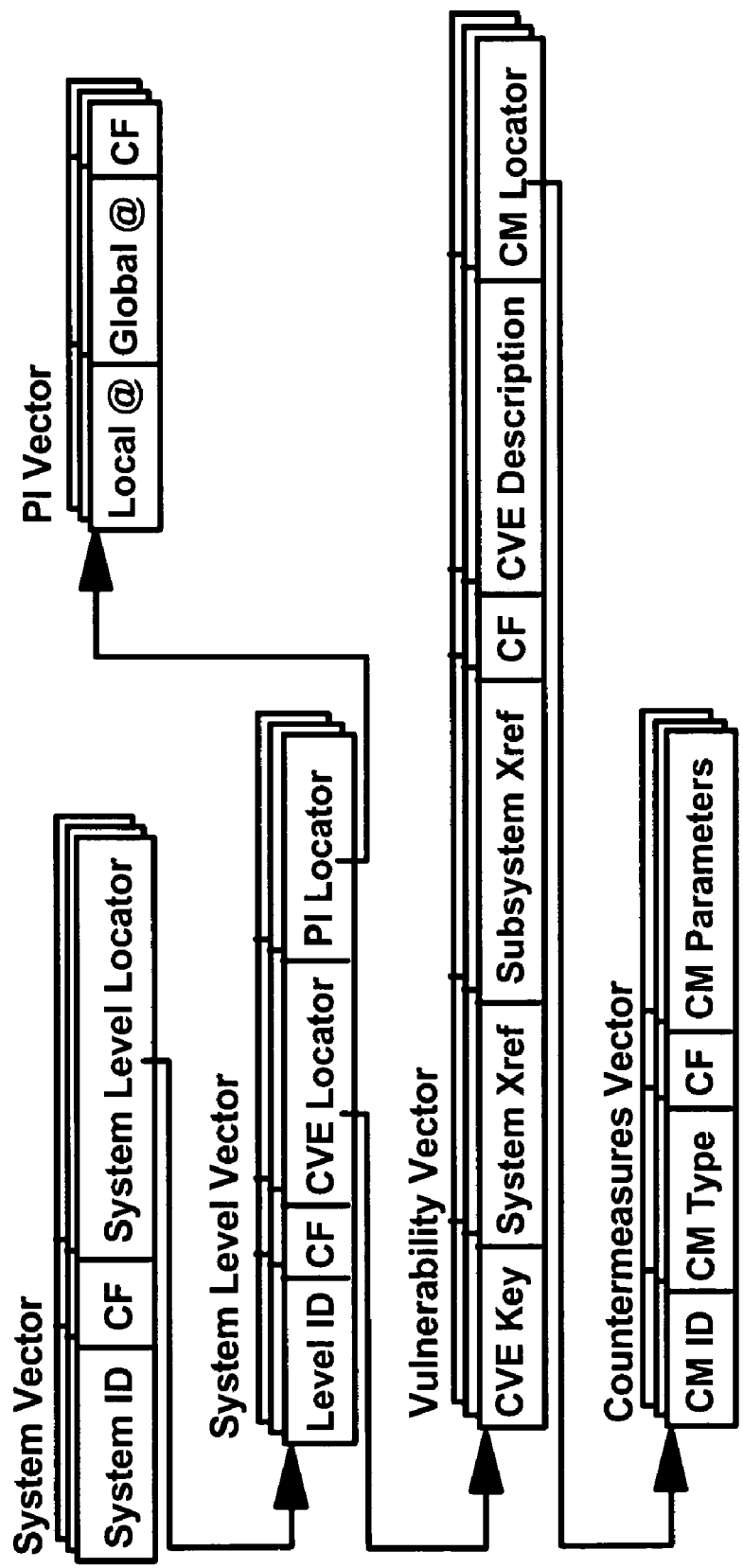
FIG. 32 illustrates a detailed data structure of threat management vectors and subvectors including program instance vectors and program instance locations according to embodiments of the present invention.

The generation and use of a Program Instance (PI) vector according to various embodiments of the present invention now will be described. In some embodiments of the present invention, the content of the "Instance ID" field of the System Level Vector and Subsystem Level Vector, which was shown in FIG. 31 as well as FIGS. 20-22, provides a pointer to a PI Vector. The pointer is referred to herein as a PI Locater. The PI Locater and PI Vector are shown in FIG. 32. It will be understood however, that in other embodiments, the PI Locater and/or PI Vector may use an existing TMV field other than the "Instance ID" and/or may use a new TMV field.

The PI Vector is a data structure that identifies program instances of a system or subsystem type and level, a local address for routing of information and program controls to the program instance within each target system, and the global address for network routing of TMV data to target systems within the administrative domain of the TMDC. There may be multiple PI Vector components for a given system/subsystem and level, each representing a specific instance of an onboard program of that type within the target system environment. The PI Vector may be instantiated and configured as will be described below.

The generation and use of a TMG Generation Number (TMVGN) to track TMVs that are processed by the TMDC and to control transmitting of TMVs that were not previously transmitted to a program instance at a target computer system due to unavailability of the program instance, upon availability of the program instance, according to various embodiments of the invention, now will be described. In particular, it may be common for target systems or certain of their PIs to have periods of non-availability. Examples include the period prior to the initial configuration and Initial Program Load (IPL) of a target system PI, and the periods between IPLs of PIs during which the PI is "powered down". During these periods, it may not be feasible to expect to be able to communicate TMVs to PIs directly, which may lead to gaps in time during which TMVs are generated and disseminated by the TMVG but not received by target system PIs.

In order to allow the scope of these gaps to be known precisely and resolved upon reestablishment of availability of these target system PIs, some embodiments of the present invention can provide a data structure called the TMVGN. The TMVGN is initially instantiated in the TMV history file with an initial value such as 0. Each time a TMV is created by the TMVG, the current TMVGN is retrieved from the TMV history file and its value is incremented by, for example, +1. The new TMVGN is recorded in the TMV Root Vulnerability Vector for transmission in the TMV. The new TMVGN also replaces the TMV history file (TMVGN) when the new TMV data is incorporated in to the TMV history file. When a PI is configured and its PI vector component is instantiated in the target system TMIB according to some embodiments of the present invention, the PI vector component is augmented with a TMVGN field. The TMVGN associated with the TMV history file data used for configuration operation is stored in the TMVGN field. Thus, by virtue of this TMVGN maintenance, it is possible to know precisely which TMVs each target system PI has "missed" during its non-availability and to populate target system TMIVs with the missing information as target system PIs become available.

Figure 33:
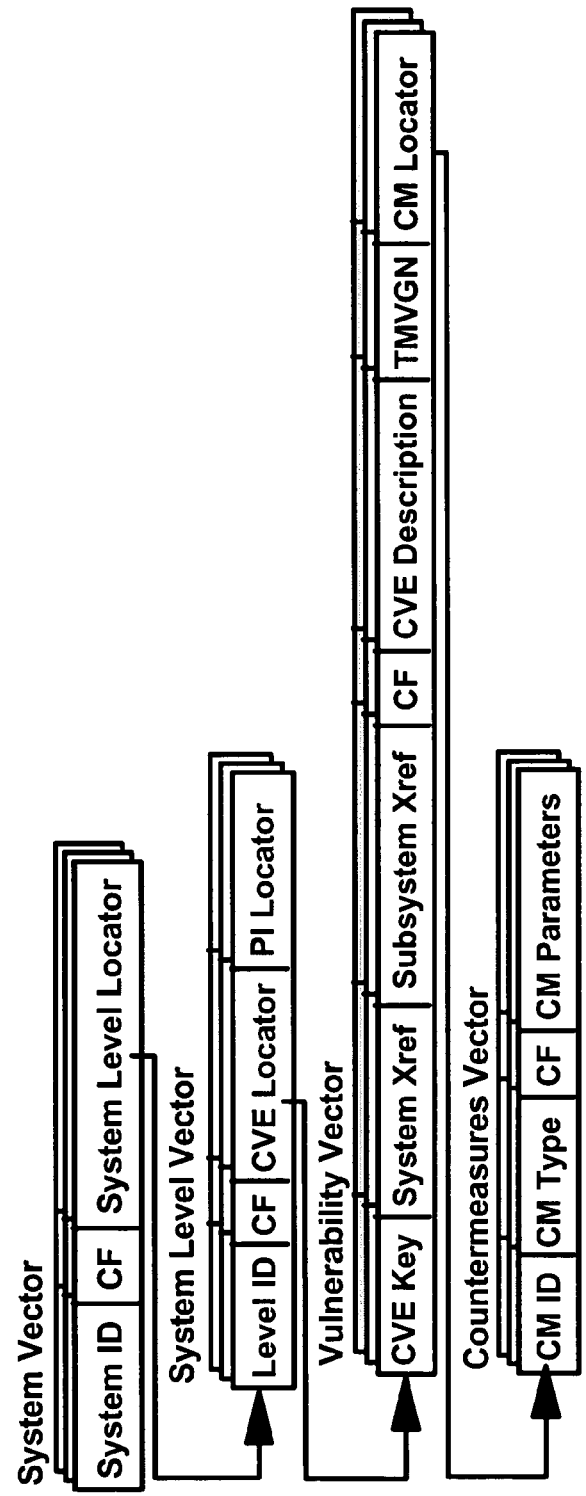
FIGS. 33A-33C illustrate detailed data structures of threat management vectors according to embodiments of the present invention.

FIGS. 33A-33C summarize the impact of the TMVGN construct to relevant data structures according to some embodiments of the present invention. As was described above, a TMVGN field is added of scope global, to the entire TMV history file. A TMVGN field is added to the Root Vulnerability Vector as shown in FIG. 33A. Mutated TMVs are also shown in FIG. 33B. The TMVGN moves with the vulnerability vector in the mutated structure as also shown in FIG. 33B. Finally, a field is added to the PI vector representing the TMVGN last known to the PI as shown in FIG. 33C.

Domain Store and Forward Repositories (DSFRs), which are configured to store a TMV until the TMV has been provided to all program instances at the domain of target computer systems and to purge the TMV thereafter, according to various embodiments of the present invention, now will be described. Assuming a capability of target systems to register their PI inventory and the TMVs already incorporated into each PI TMIB, as will be described below, it is possible for a TMDC to know precisely which TMVs have been generated by the central TMV generator, but not received by the TMDCs target systems. The DSFR provides a mechanism for instrumenting this knowledge. In general, in a stable network topology, there is some point in time, i.e., some point in the sequence of TMV generations, that can be fixed, at which the existence of the TMDC "predates" the target systems in its domain. Another way of stating this is that there is no target system in the domain that has in its TMIB, a TMVGN greater than the highest TMVGN known to the TMDC.

Thus, for a well behaved operation within a stable threat management domain, the TMDC may only need to have at its disposal at any given time, only those TMVs whose generation number (TMVGN) is greater than the highest TMVGN configured in the "youngest" (latest configured or latest to be contacted after a period of unavailability) target system PIs within its domain. Otherwise, the TMDC may need to have TMVs whose TMVGN is less than or equal to those known by any target system PI in its domain2—but that would be redundant information because, as was described in the parent applications, target systems may always be configured with all TMVs generated up to the time of the configuration operations.

Therefore, in some embodiments of the present invention, a DSFR is provided such that each TMV received from the TMVG by the TMDC is catalogued there until its TMVGN becomes less than or equal to the highest TMVGN reported by all of the registered target system PIs within its domain. The purge point may be defined as that TMVGN satisfying the quality criteria. The purge point thus can provide an efficient system for keeping the DSFR small in size. The DFSR, thus, can be thought of as a TMV history file subset containing all TMV data with TMVGNs greater than the purge point. A DSFR is illustrated in FIG. 29 at 2940, as a TMV Store & Forward.

PI registration according to various embodiments of the present invention now will be described. According to some embodiments, at least one of the target systems comprises a plurality of PIs and the target system is configured to register the plurality of PIs with the TMDC. In some embodiments, each of the PIs itself is configured to register with the TMDC. In other embodiments, the target system itself is configured to register the plurality of PIs in the target system with the TMDC.

More specifically, within a given threat management domain, the TMDC can have a well-known address such as an IP address host name and/or other address. The address may be made known to target systems, for example during the target system configuration process that has already been described. At the earliest convenient time, the PIs of each target system within a threat management domain are registered with the TMDC, for example via an assigned service port. A "PI Registration Request" Protocol Data Unit (PDU) is sent to the TMDC such that, for each PI within the target system, that portion of its TMIB including system/subsystem vectors, system/subsystem level vectors and PI vectors are reported to the TMDC and stored by the TMDC in TMIB facsimiles (TMIB' 2930) representing registration information. According to some embodiments of the invention, registration can be controlled in at least two ways: in some embodiments program instances may register themselves during the program initialization sequence, for example, by establishing a session with the TMDC and transmitting their TMIB information. Alternatively, a target system control program or system, operating on behalf of the PIs within its environment, may establish a session with the TMDC and incrementally register all of its PIs.

Figure 34:
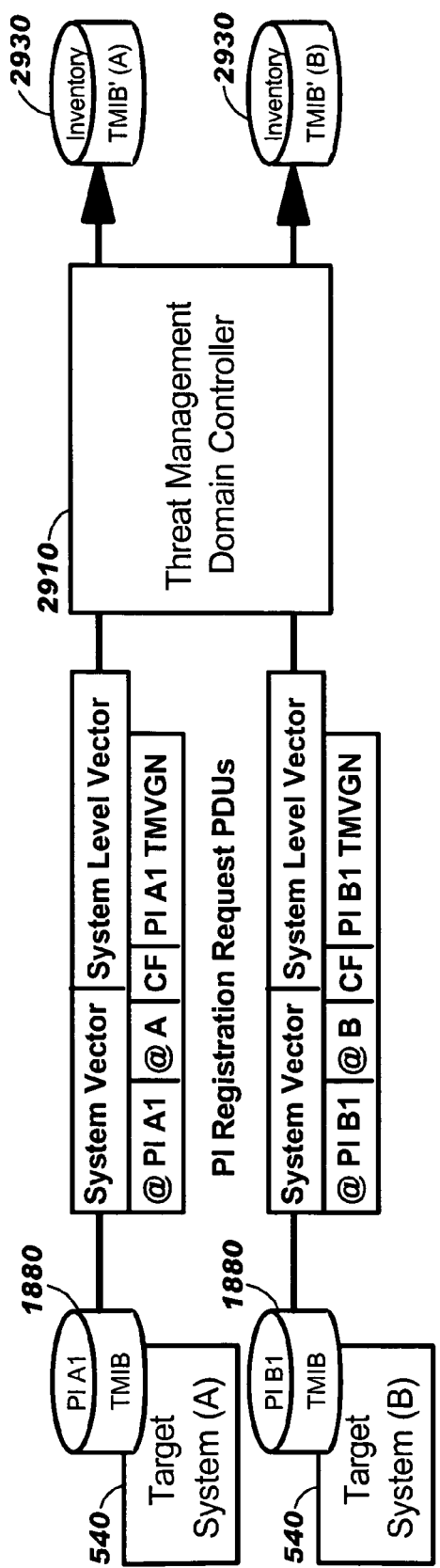
FIGS. 34 and 35 are block diagrams of program instance registration according to embodiments of the present invention.

FIG. 34 is a block diagram of PI registration according to some embodiments of the present invention. As shown in FIG. 34, two simple (single PI) target systems 540 each registers their PI of a particular system/subsystem type and level, along with its last known TMVGN with the TMDC 2910. The information is then stored in a TMIB facsimile 2930 maintained by the TMDC. Note that in FIG. 34, TMIB'(A) represents the collection of TMIB'(PI) associated with target system A.

Figure 35:
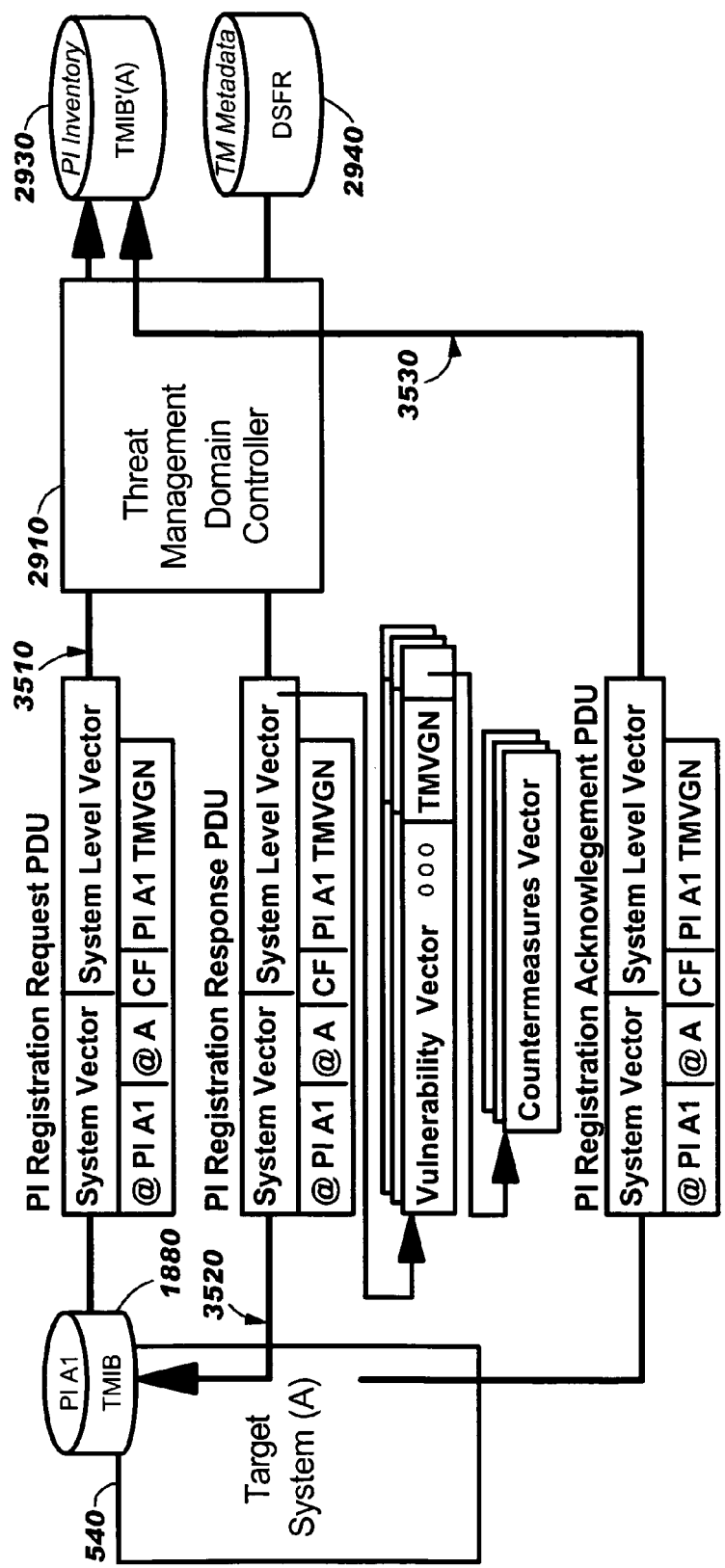
Figure 36:
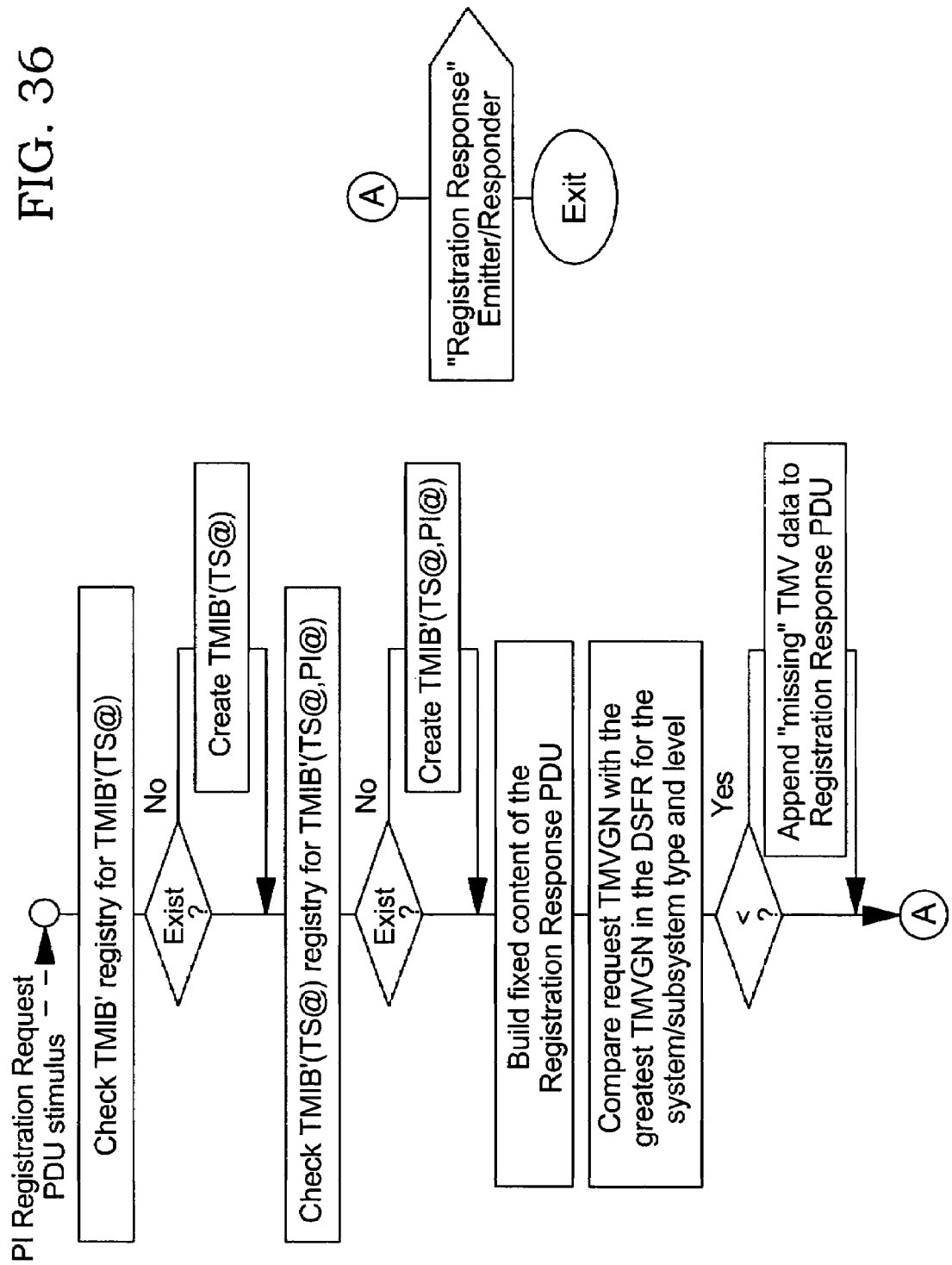
FIG. 36 is a flowchart of operations that may be performed for program instance registration according to embodiments of the present invention.

To complete the registration, the TMDC returns a "Registration Response PDU", which includes the original request data augmented with the requested vulnerability/countermeasure information, i.e., all vulnerability vectors associated with the given system/subsystem type and level bearing a TMVGN greater than the TMVGN reported by the target system during registration. Upon incorporating the return vulnerability/countermeasure information (if any), the target system returns a "PI Registration Acknowledgement PDU" bearing the highest TMVGN of the newly incorporated information. The TMDC then updates its TMIB'(A) with the acknowledgement TMVGN. FIG. 35 illustrates a registration sequence for the embodiments that were illustrated in FIG. 34. PDUs are sent in a sequence shown by reference numbers 3510-3530 in FIG. 35. FIG. 36 is a flowchart of operations that may be performed for PI registration according to various embodiments of the invention.

TMV refreshing according to various embodiments of the present invention now will be described. As was described above in connection with PI registration with the TMDC, the TMDC can exercise the DSFR "purge point" to reduce or minimize DSFR physical size. Embodiments of the present invention can provide a TMV refresh protocol to govern refreshing of TMVs.

Under the TMV refresh protocol, it may happen that there is an excessive period of time between configuration of target system PIs and their initial registration with the TMDC. In such cases, it is possible that the highest TMVGN incorporated by the configuration process is lower than the lowest TMVGN being held in the DFSR by more than one (1) which may represent a gap in TMV information readily available to the TMDC versus what is used for PI registration. In such cases, according to some embodiments of the present invention, the target system registration process may be paused while the TMDC engages the TMV refresh protocol with the TMVG to procure the missing TMV information.

Figure 37:
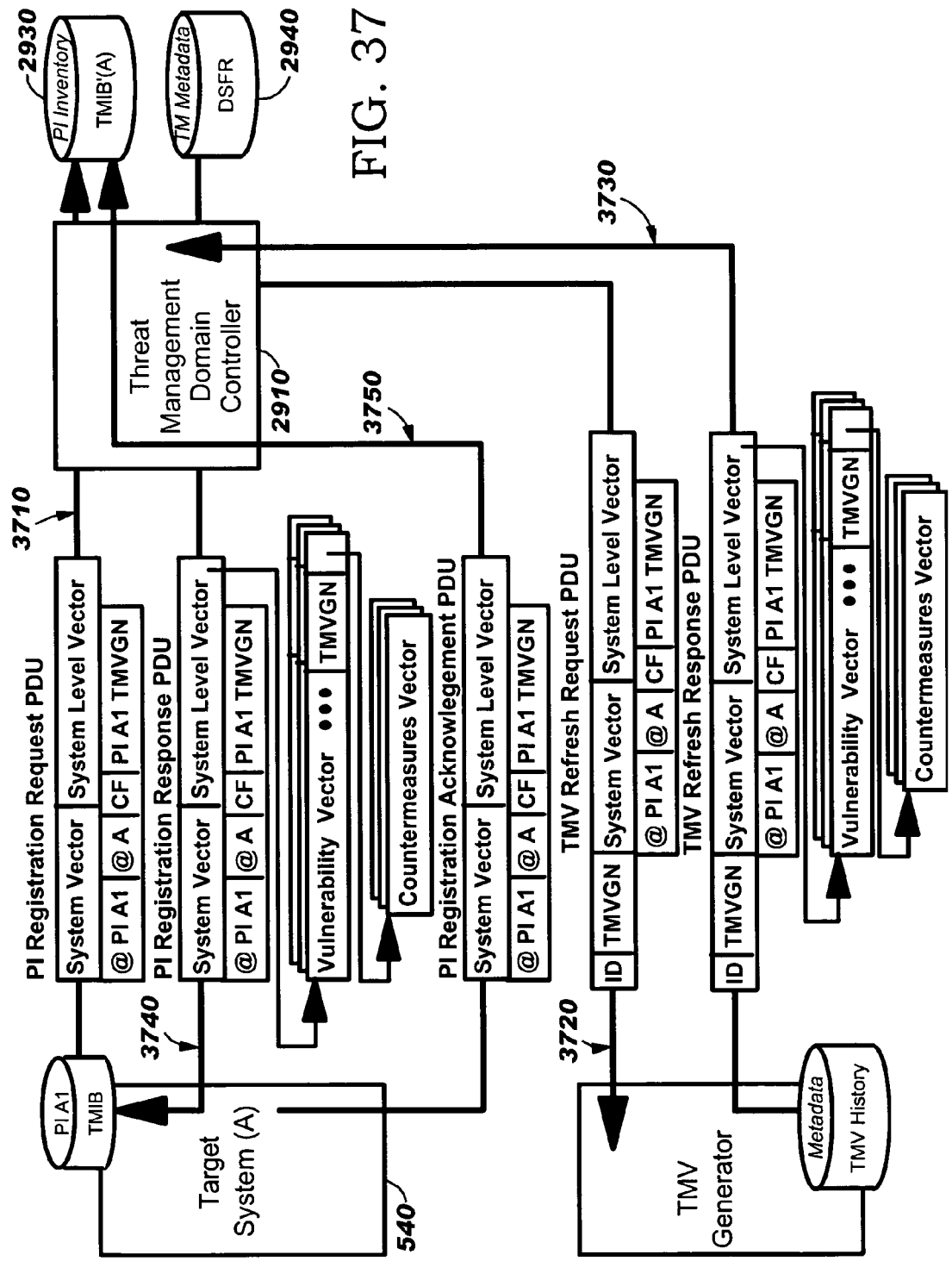
FIG. 37 is a block diagram of threat management vector refreshing according to embodiments of the present invention.

Protocol Data Units (PDUS) are exchanged between the TMDC and the TMVG as illustrated in FIG. 37. The "TMV Refresh Request" PDU bears a request ID for correlation of the response, the lowest TMVGN known to the TMDC, the target system's PI registration information, including the system/subsystem types and levels being registered, and their PI vectors. These vectors also contain the highest TMVGN known by the target system PI for each of the system/subsystem types and levels being registered. In its "TMV Refresh Response" PDU, the TMVG appends to each system level vector of the Request PDU, those vulnerability vectors representing vulnerabilities applicable to the system type and level whose TMVGN is greater than that reported for the PI but less than that reported for the TMDC, thus closing the gap in the information. Upon receiving a response, the TMDC may then complete the PI registration by incorporating the refresh information into the PI registration response PDU. Thus FIG. 37 illustrates the PI registration protocol with a TMV refresh protocol included. Message flow may proceed as indicated by 3710-3750 in FIG. 37.

Figure 38:
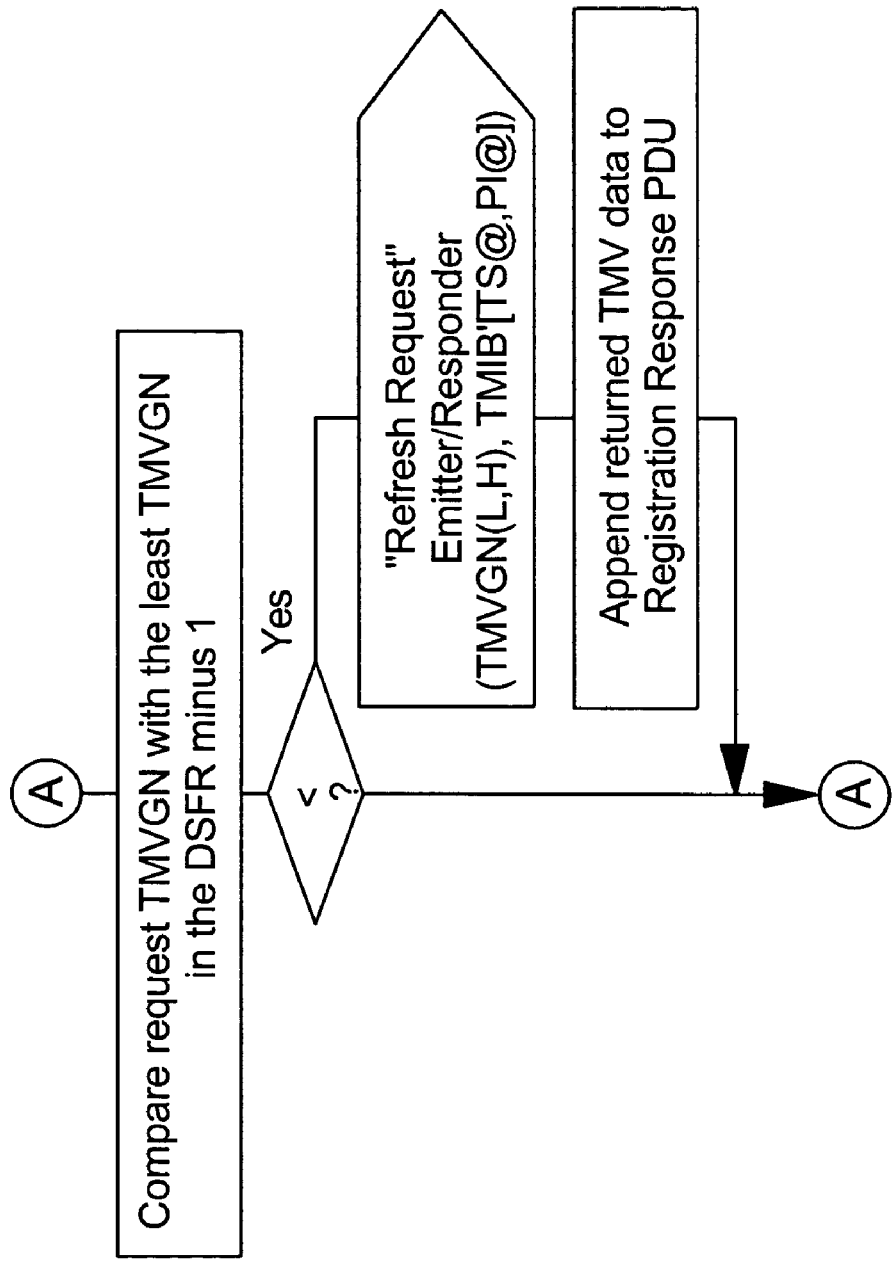
FIG. 38 is a flowchart of operations that may be performed for threat management vector refreshing according to embodiments of the present invention.

FIG. 38 is a flowchart of operations that may be performed to provide TMV refresh according to various embodiments of the present invention. As shown in FIG. 38, to establish a TMV refresh, the logic of FIG. 38 is inserted at junction A of the flowchart of FIG. 36. In FIG. 38, TMVGN (L,H) means a TMVGN pair representing the lowest (L) and the highest (H) in a range.

PI recalibration according to various embodiments of the present invention now will be described. It has already been described that PIs may instigate registration themselves or registration may be done by a target system control program or system on behalf of PIs within its scope of control. The same may be true for exchanges in general between the TMIBs, PIs and the TMDC. Over the course of time following PI registration, it may be that certain PIs are unavailable (such that their TMIBs are inaccessible to the TMDC and the TMDC is inaccessible to the PI TMIB). It may be that the PI is shut down (for example between IPLs), or it may be that the entire target system is unavailable.

During such periods of time, it is conceivable that a TMDC may continue to receive TMVs of relevance to the PI, and that the distribution of such new information to a target system PI is temporarily prevented. By virtue of the DFSR, a TMDC is equipped to withhold delivery of TMVs to PI TMIBs until they subsequently become available.

When such target systems or PIs subsequently become available, they may need to be recalibrated with new threat management information by delivering to them all relevant TMVs received by the TMDC during their period of non-availability.

According to some embodiments of the present invention, PI recalibration may be accomplished virtually identically as PI registration, except that the TMDC may already possess a TMIB' representing the PI when the registration occurs. Thus, PI recalibration may be defined as PI registration, wherein the TMDC possesses a preexisting TMIB' for the PI. The net effect may be that the PI receives all relevant TMVs that are missed during its non-availability.

PI deregistration according to various embodiments of the present invention now will be described. In particular, it is conceivable that certain PIs of target systems will be uninstalled or otherwise permanently removed from the target system-operating environment. Such an action may naturally involve the removal of the PI's TMIB from the target system. According to some embodiments of the present invention, PI deregistration may be performed coincident with PI removal. PI deregistration can entirely remove knowledge of the PI from the TMDCs information base.

Figure 39:
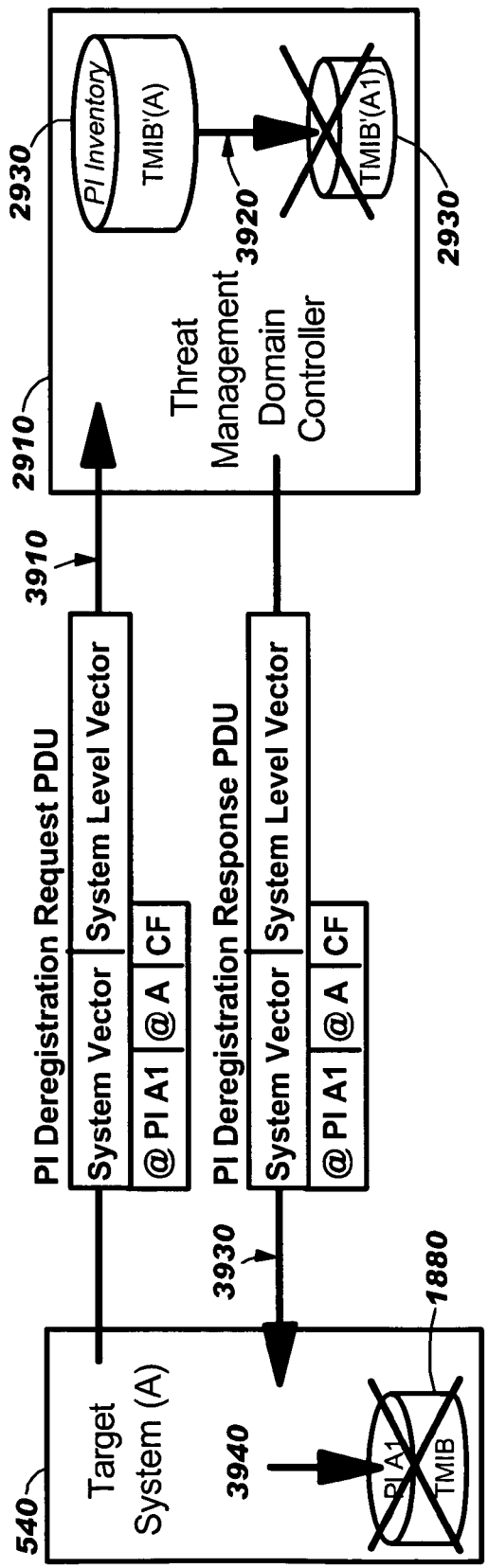
FIG. 39 is a block diagram of program instance deregistration according to embodiments of the present invention.

FIG. 39 illustrates an example of PI deregistration. During the removal of a PI (A1) from a target system (A), the PI or the target system (whichever the case) transmits a "PI Deregistration Request" PDU to the TMDC as shown at 3910. Upon receipt, the TMDC destroys that portion of its TMIB' for target system A representing the designating PI, as shown at 3920. The TMDC then returns to target system A a "PI Deregistration Response" PDU as shown by 3930, thus indicating that the deregistration is complete. Upon receipt of the response at the target system, the TMIB representing the PI being removed is destroyed as shown at 3940.

Input TMV processing according to various embodiments of the present invention now will be described. Input TMV processing can incorporate some or all of the various embodiments of the invention that were described above. In particular, according to various embodiments of the invention, TMDCs, rather than target systems, receive the TMVs. Within each threat management domain, TMDCs then forward to target systems within their domains, processed TMVs that are customized to, for example, allow improved target system CPU and/or buffer utilization, and/or to allow improved network utilization within the domain. To accomplish this potential efficiency, in addition to the provisions described previously, some embodiments of the present invention may also include the following operations. These operations are shown by 4910-4960 in FIG. 40, and are described below:

The "TMV mutation" of the "TMV induction" of the prior applications is removed from target systems and replaced by a similar or identical TMV induction associated with the TMDC at 4910, so that mutation is performed only once within the threat management domain rather than multiple times throughout the target system population. At 4920, following the TMV mutation, the TMV content is incorporated into the DSFR and the DSFRs TMVGN is updated to reflect the new input. At 4930, for each target system within its domain, the TMDC interrogates the PI system/subsystem and level information within each TMIB' for each target system, looking for a match with the corresponding vector components of the mutated input TMV. For each PI found to match the comparison criteria, a customized mutated TMV containing only those system/subsystem and level vectors, Vulnerability Vector and Countermeasures Vector corresponding to the match criteria is cloned from the TMV, at 4940.

The TMV is transmitted to the target system PI using the routing information supplied by the target system during the PI registration described previously at 4950. If the TMV Inductor for the PI is available, it acknowledges receipt in a PDU bearing the receive TMVGN. Otherwise, TMV distribution is self-correcting and will be accomplished as a consequence of PI recalibration when the PI again becomes available, according to 4920 and embodiments of the present invention previously described. When all of the eligible and available PIs within the domain have been serviced, the mutated input TMV is destroyed at 4960. Note that in FIG. 40, Target System A has one PI (A1), and it is affected by the input TMV content. Target System B has two PIs (B1 & B2), and they are both affected by the input TMV content. Finally, Target System C also has two PIs (C1 & C2), but neither of them are affected by the input TMV content.

Figure 40:
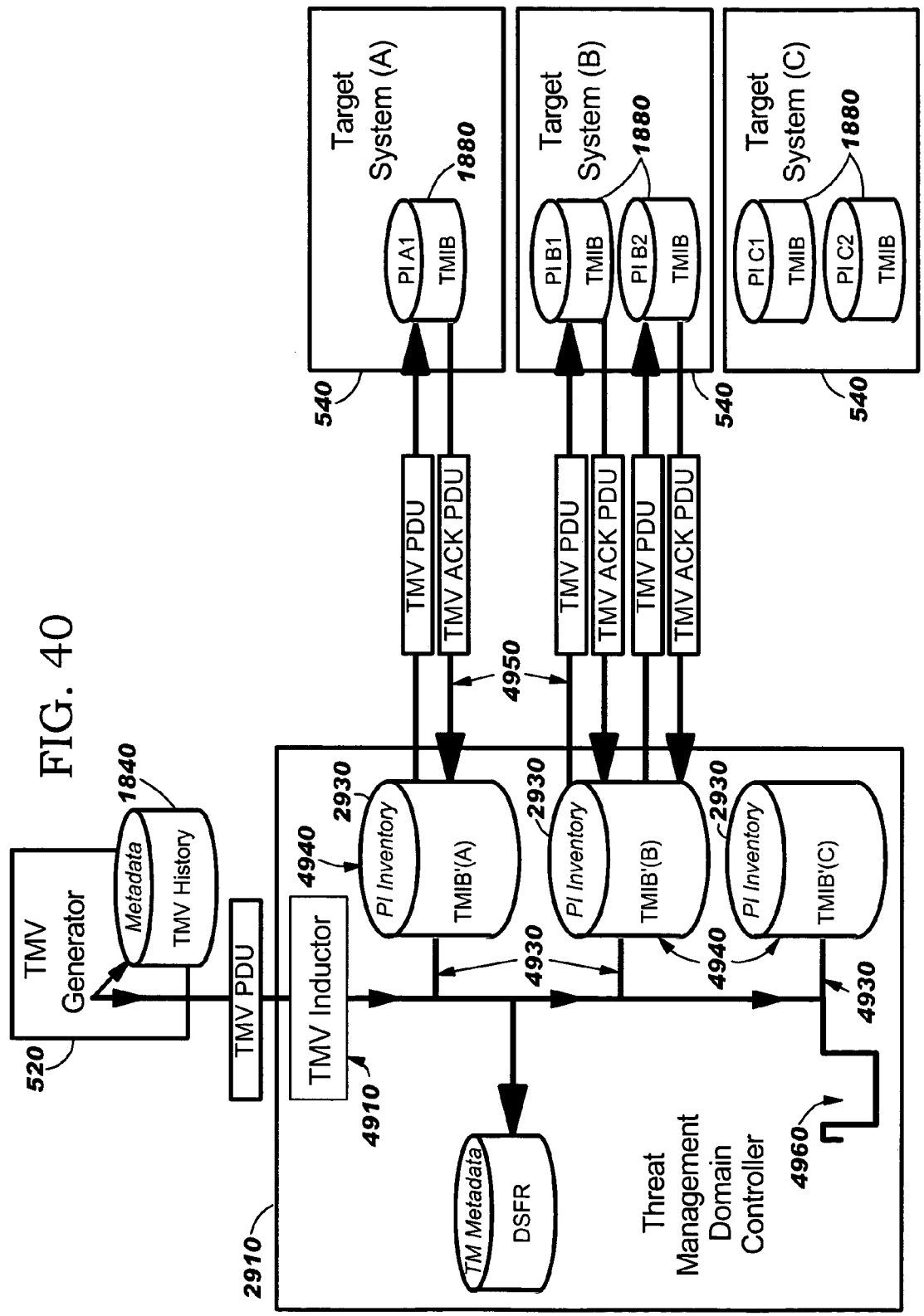
FIG. 40 is a block diagram of input threat management vector processing according to embodiments of the present invention.
Figure 41:
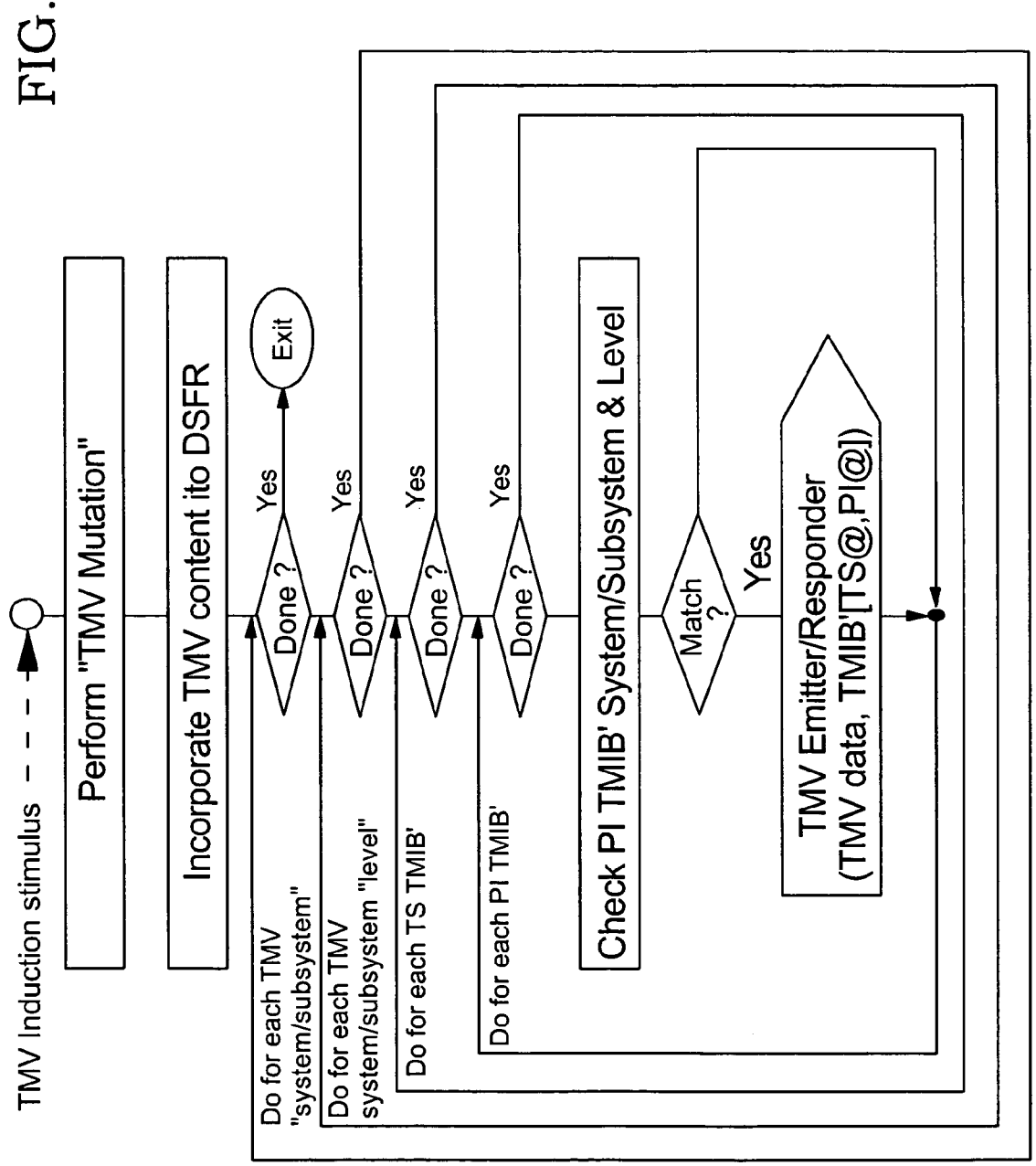
FIG. 41 is a flowchart of operations that may be performed for input threat management processing according to embodiments of the present invention.
Figure 42A:
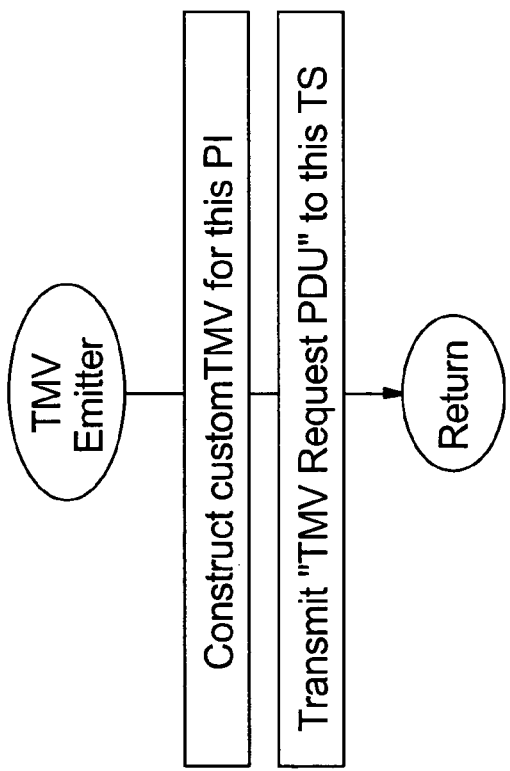
FIGS. 42A and 42B are flowcharts of operations that may be performed for input threat management vector processing by a threat management vector emitter and responder, respectively, according to embodiments of the present invention.
Figure 42B:
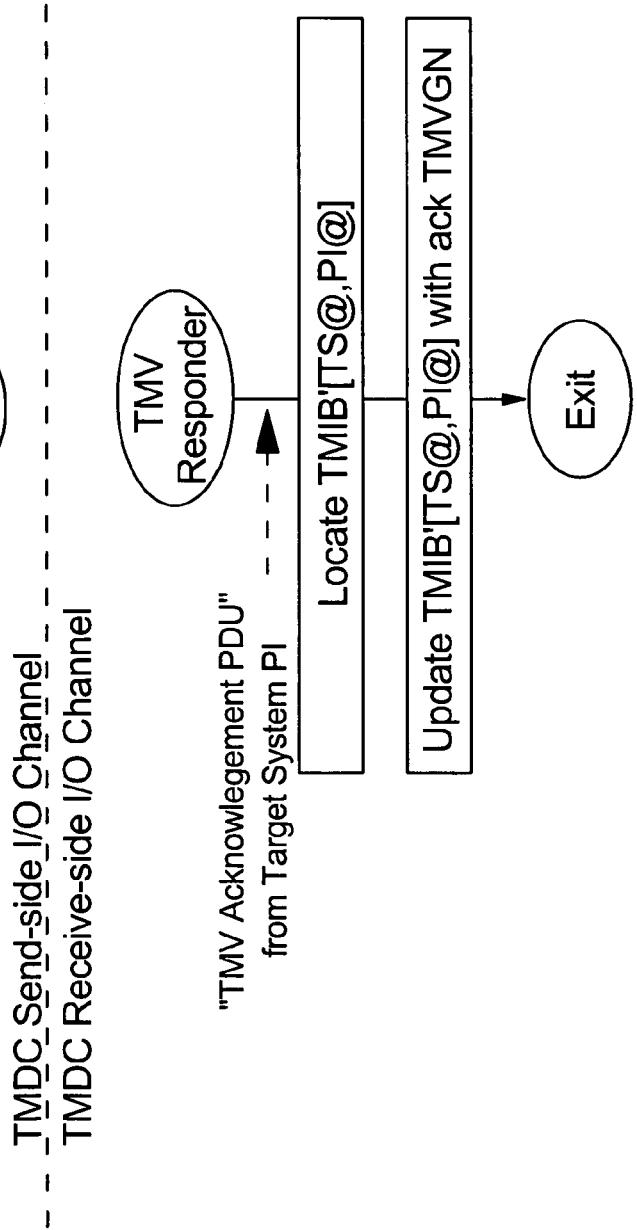

FIG. 41 is a flowchart of operations for input TMV processing as was described in connection with FIG. 40. FIG. 42A is a flowchart of input TMV processing by a TMV emitter. FIG. 42B is a flowchart of TMV processing by a TMV responder.

Figure 43:
FIG. 43 is a block diagram of threat management vector synchronization according to embodiments of the present invention.

Finally, TMV synchronization according to various embodiments of the present invention will be described. In particular, although embodiments of the preset invention may generally assume that a TDMC will maintain a secure TCP/IP (or other) session with the TMVG, it is conceivable that for certain periods of time such as a session may be disabled or otherwise unavailable. In certain circumstances this can result in TMDCs missing some TMV or sequence of TMVs generated by the TMVG. That is, the TMDC and TMVG may become unsynchronized. To accommodate such a circumstance, embodiments of the present invention can provide that, if a TMDC receives a TMV with a TMVGN exceeding the TMVGN of the TMDC's DSFR by more than one (1), then the TMDC initiates a "TMVGN Synchronization" to acquire the missing TMVs, according to the following provisions and as shown in FIG. 43:

A "Synchronize Request" PDU is defined at 4310, containing a "Starting TMVGN" field and an "Ending TMVGN" field. These indicate the TMVGN from the DSFR plus one (+1) and the TMVGN value from the TMV that caused the TMDC to detect the disruption of synchronism minus one (−1), respectively. In response, at 4320, the TVMG initiates an incremental sequence of TMVs to the requesting TMDC, representing the range of TMVGNs specified in the request, by reconstituting the TMVs from its TMV History File.

Due to the fact that certain TMVs "supersede" prior TMVs, it may be that certain TMVGNs in a historical sequence will indeed be missing due to their obsolescence. For such cases, while satisfying a given Synchronize Request PDU, a TMVG may generate one or more "null" TMVs, indicating that the TMVGN should be ignored. A null TMV may be indicated in an appropriate control field of the Root Vulnerability Vector (and/or by the absence lower level vectors), and the TMVGN field of that vector indicates the TMVGN to be ignored. Other fields may be deprecated.

Accordingly some embodiments of the present invention can provide a threat management domain controller that intervenes between a TMV generator or one or more domains of target computer systems. By providing a multi-tier threat management architecture, some embodiments of the present invention can improve or maximize scalability. Overall resource requirements including network bandwidth and target system CPU and buffer utilization can be reduced and/or minimized. Reliable delivery of actionable threat management information to target systems can be enhanced. Moreover, the need for human intensive tasks may be reduced or eliminated. In particular, the administrator-driven initial configuration of vulnerability inventory for target systems may be reduced or eliminated. TMVGNs also can be used to represent a form of time calibration, i.e., ticks of a clock in a threat management time continuum.

Some embodiments of the present invention can improve or optimize information flow in that each target system may receive only that information that it actually needs and only when it is needed. Moreover, computational efficiency may be provided. Embodiments of the present invention also can be naturally self-correcting. The "purge point" construct can reduce or minimize storage for TMV data within a TMDC. The "null TMV" construct can maintain time continuity. Finally, a convention of setting the TMVGN to zero upon initial registration may cause the system to auto-configure target systems with historical threat management information of relevance to them, which can replace the need for human intervention for initial configuration of target system vulnerability inventory and may also reduce or eliminate a significant operational cost factor in implementation.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A system for generating computer security threat management information, comprising:
   a Threat Management Domain Controller (TMDC) that is responsive to a computer-actionable Threat Management Vector (TMV), the TMV including therein a first computer-readable field that provides identification of at least one system type that is affected by a computer security threat, a second computer-readable field that provides identification of a release level for the system type, and a third computer-readable field that provides identification of a set of possible countermeasures for a system type and a release level, the TMDC being configured to process a TMV that is received for use by a domain of target computer systems and to transmit the TMV that has been processed to at least one of the target computer systems in the domain of target computer systems.

2. A system according to claim 1 wherein the TMDC is configured to process a TMV that is received for use by a domain of target computer systems and to transmit the TMV that has been processed to at least one of the target computer systems in the domain of target computer systems, by selectively transmitting the TMV that is received to the at least one of the target computer systems if the TMV applies to the at least one of the target computer systems.

3. A system according to claim 1 wherein the TMDC is configured to process a TMV that is received for use by a domain of target computer systems and to transmit the TMV that has been processed to at least one of the target computer systems in the domain of target computer systems, by selectively transmitting selected fields in the TMV that is received to the at least one of the target computer systems.

4. A system according to claim 1 wherein the TMDC is configured to process a TMV that is received for use by a domain of target computer systems and to transmit the TMV that has been processed to at least one of the target systems in the domain of target computer systems, by mutating the TMV that is received to a format that is compatible with the at least one of the computer systems in the domain of target systems.

5. A system according to claim 1 wherein the TMDC is configured to process a TMV that is received for use by a domain of target computer systems and to transmit the TMV that has been processed to at least one of the target systems in the domain of target computer systems, by transmitting to the selected one of the target computer systems, the TMV, including a Program Instance (PI) vector that identifies a program instance at a selected one of the target computer systems.

6. A system according to claim 1 wherein the TMDC is configured to process a TMV that is received for use by a domain of target computer systems and to transmit the TMV that has been processed to at least one of the target systems in the domain of target computer systems, by having a TMV generator generate a TMV Generation Number (TMVGN) that tracks TMVs that are processed by the TMDC and by using the TMVGN to control transmitting of TMVs that were not previously transmitted to a program instance at a target computer system due to unavailability of the program instance, upon availability of the program instance.

7. A system according to claim 1 wherein the TMDC further comprises a Domain Store and Forward Repository (DSFR) that is configured to store a TMV until the TMV has been provided to all program instances in the domain of target computer systems and to purge the TMV thereafter.

8. A system according to claim 1 wherein the at least one of the target systems comprises a plurality of program instances, and wherein the at least one of the target systems is configured to register the plurality of program instances with the TMDC.

9. A system according to claim 8 wherein each of the program instances is configured to register with the TMDC, and to reregister with the TMDC upon reinstatiation.

10. A system according to claim 8 wherein the TMDC further comprises a target system control system that is configured to register the plurality of program instances in the target system with the TMDC.

11. A system according to claim 8 wherein the TMDC is further configured to obtain missing TMV information and to transmit the missing TMV information to the at least one of the target systems during registration of the plurality of program instances with the TMDC.

12. A system according to claim 1 wherein the system type comprises a computer operating system type and/or an application program type.

13. A system according to claim 1 further comprising a TMV generator that is configured to generate the TMV from a notification of a security threat that is received and to transmit the TMV to the TMDC.

14. A system according to claim 13 wherein the TMV generator and the TMDC are further configured to synchronize TMV transmission therebetween such that all TMVs that are applicable to the domain of target systems are received by the TMDC.

15. A system according to claim 1 wherein the target systems are configured to process the countermeasures that are identified in the processed TMV that is received from the TDMC.

16. A method for generating computer security threat management information, comprising:
receiving a computer-actionable Threat Management Vector (TMV) including therein a first computer-readable field that provides identification of at least one system type that is affected by a computer security threat, a second computer-readable field that provides identification of a release level for the system type, and a third computer-readable field that provides identification of a set of possible countermeasures for a system type and a release level;
processing the TMV that is received for use by a domain of target computer systems; and
transmitting the TMV that has been processed to at least one of the target computer systems in the domain of target computer systems.

17. A computer program product that is configured to generate computer security threat management information, the computer program product comprising a computer usable storage medium having computer-readable program code embodied in the medium, the computer-readable program code comprising:
computer-readable program code that is responsive to a computer-actionable Threat Management Vector (TMV), the TMV including therein a first computer-readable field that provides identification of at least one system type that is affected by a computer security threat, a second computer-readable field that provides identification of a release level for the system type, and a third computer-readable field that provides identification of a set of possible countermeasures for a system type and a release level, the computer-readable program code being configured to process a TMV that is received for use by a domain of target computer systems and to transmit the TMV that has been processed to at least one of the target computer systems in to the domain of target computer systems.

18. A computer program product according to claim 17 wherein the computer-readable program code is configured to process a TMV that is received for use by a domain of target computer systems and to transmit the TMV that has been processed to at least one of the target computer systems in the domain of target computer systems, by selectively transmitting the TMV that is received to the at least one of the target computer systems if the TMV applies to the at least one of the target computer systems.

19. A computer program product according to claim 17 wherein the computer-readable program code is configured to process a TMV that is received for use by a domain of target computer systems and to transmit the TMV that has been processed to at least one of the target computer systems in the domain of target computer systems, by selectively transmitting selected fields in the TMV that is received to the at least one of the target computer systems.

20. A computer program product according to claim 17 wherein the computer-readable program code is configured to process a TMV that is received for use by a domain of target computer systems and to transmit the TMV that has been processed to at least one of the target systems in the domain of target computer systems, by mutating the TMV that is received to a format that is compatible with the at least one of the target systems in the domain of target systems.

21. A computer program product according to claim 17 wherein the computer-readable program code is configured to process a TMV that is received for use by a domain of target computer systems and to transmit the TMV that has been processed to at least one of the target systems in the domain of target computer systems, by generating a Program Instance (PI) vector that identifies a program instance at a selected one of the target computer systems and by transmitting the TMV, including the PI vector, to the selected one of the target computer systems.

22. A computer program product according to claim 17 wherein the computer-readable program code is configured to process a TMV that is received for use by a domain of target computer systems and to transmit the TMV that has been processed to at least one of the target systems in the domain of target computer systems, by generating a TMV Generation Number (TMVGN) that tracks TMVs that are processed by the TMDC and by using the TMVGN to control transmitting of TMVs that were not previously transmitted to a program instance at a target computer system due to unavailability of the program instance, upon availability of the program instance.

23. A computer program product according to claim 17 further comprising:
   computer-readable program code that is configured to provide a Domain Store and Forward Repository (DSFR) that is configured to store a TMV until the TMV has been provided to all program instances in the domain of target computer systems and to purge the TMV thereafter.

* * * * *